US012672078B2

(12) United States Patent
Wu et al.

(10) Patent No.: US 12,672,078 B2
(45) Date of Patent: Jun. 30, 2026

(54) METHOD AND DEVICE IN NODES USED FOR WIRELESS COMMUNICATION

(71) Applicant: Apogee 5G Global, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 232 days.

(21) Appl. No.: 18/423,305

(22) Filed: Jan. 26, 2024

(65) Prior Publication Data

US 2024/0172139 A1      May 23, 2024

Related U.S. Application Data

(63) Continuation of application No. PCT/CN2022/108193, filed on Jul. 27, 2022.

(30) Foreign Application Priority Data

Jul. 30, 2021      (CN) .......................... 202110869235.4

(51) Int. Cl.
*H04W 52/36* (2009.01)
*H04W 52/34* (2009.01)

(52) U.S. Cl.
CPC ......... *H04W 52/367* (2013.01); *H04W 52/34* (2013.01)

(58) Field of Classification Search
CPC .............................. H04W 52/367; H04W 52/34
See application file for complete search history.

(56) References Cited

U.S. PATENT DOCUMENTS 10,231,188 B1      3/2019   Singh et al.
10,764,832 B2      9/2020   Comsa et al.
(Continued)

FOREIGN PATENT DOCUMENTS

CN          104902559 A      9/2015
WO      2012057579 A2      5/2012
(Continued)

OTHER PUBLICATIONS

Blackberry UK Limited, "UL Transmit Power Control for Dual Connectivity," 3GPP TSG RAN WG1 Meeting #77, R1-142355, Seoul, Korea (May 19-23, 2014).
(Continued)

*Primary Examiner* — Junpeng Chen
(74) *Attorney, Agent, or Firm* — VOLPE KOENIG

(57)          ABSTRACT

A first node receives a first signaling; transmits a first signal in a first transmission occasion in a first cell group; transmits or drops transmitting a second sub-signal in a second transmission occasion in a second serving cell. The first signaling is used to determine a first time-domain resource; transmit power of the first signal is equal to a first power value; transmit power of a second signal is equal to a second power value, and the second signal comprises the second sub-signal; whether a sum of the first power value and the second power value minus a first maximum transmit power is greater than a first threshold is used to determine whether the second sub-signal is transmitted in the second transmission occasion in the second serving cell. The above method satisfies the demands of different duplex modes for uplink transmit power.

20 Claims, 5 Drawing Sheets

100

First node

Receiving first signaling ⌐101

Transmitting first signal in first transmission occasion in first cell group ⌐102

Transmitting second sub-signal in second transmission occasion in second serving cell, or, dropping transmitting second sub-signal in second transmission occasion in second serving cell ⌐103

(56) References Cited

U.S. PATENT DOCUMENTS

| | | | | |
|---|---|---|---|---|
| 10,873,915 | B1 | 12/2020 | Park et al. | |
| 11,019,572 | B2 | 5/2021 | Zhang | |
| 11,102,727 | B2 | 8/2021 | Xu et al. | |
| 11,147,028 | B2 | 10/2021 | Jiang et al. | |
| 11,425,587 | B2 | 8/2022 | Zhang et al. | |
| 11,678,303 | B2 | 6/2023 | Wu et al. | |
| 2017/0013565 | A1* | 1/2017 | Pelletier | H04W 52/365 |
| 2017/0086149 | A1* | 3/2017 | Takeda | H04W 52/34 |
| 2018/0184384 | A1 | 6/2018 | Dinan | |
| 2019/0159136 | A1* | 5/2019 | MolavianJazi | H04W 52/146 |
| 2019/0199571 | A1* | 6/2019 | John Wilson | H04W 52/281 |
| 2020/0314771 | A1* | 10/2020 | Frank | H04W 52/38 |
| 2020/0359336 | A1 | 11/2020 | Dinan | |
| 2021/0144715 | A1* | 5/2021 | Gotoh | H04L 1/0004 |
| 2022/0394620 | A1* | 12/2022 | Hu | H04W 28/082 |
| 2023/0032247 | A1* | 2/2023 | Vintola | H04W 52/346 |
| 2023/0134316 | A1* | 5/2023 | Takeda | H04W 52/42 |
| | | | | 370/318 |
| 2023/0217373 | A1* | 7/2023 | He | H04W 52/146 |
| | | | | 455/522 |

FOREIGN PATENT DOCUMENTS

| | | |
|---|---|---|
| WO | 2019097294 A1 | 5/2019 |
| WO | 2020047080 A1 | 3/2020 |

OTHER PUBLICATIONS

Third Generation Partnership Project, "Technical Specification Group Radio Access Network; NR; Multiplexing and channel coding (Release 16)," 3GPP TS 38.212 V16.6.0 (Jun. 2021).

Third Generation Partnership Project, "Technical Specification Group Radio Access Network; NR; Physical layer procedures for control (Release 16)," 3GPP TS 38.213 V16.6.0 (Jun. 2021).

Ththird Generation Partnership Project, "Technical Specification Group Radio Access Network; NR; Physical layer procedures for control (Release 16)," 3GPP TS 38.213 V16.5.0 (Mar. 2021).

Third Generation Partnership Project, "Technical Specification Group Radio Access Network; NR; Physical layer procedures for data (Release 17)," 3GPP TS 38.214 V16.6.0 (Jun. 2021).

* cited by examiner

100

First node

101

Receiving first signaling

102

Transmitting first signal in first transmission occasion in first cell group

103

Transmitting second sub-signal in second transmission occasion in second serving cell, or, dropping transmitting second sub-signal in second transmission occasion in second serving cell

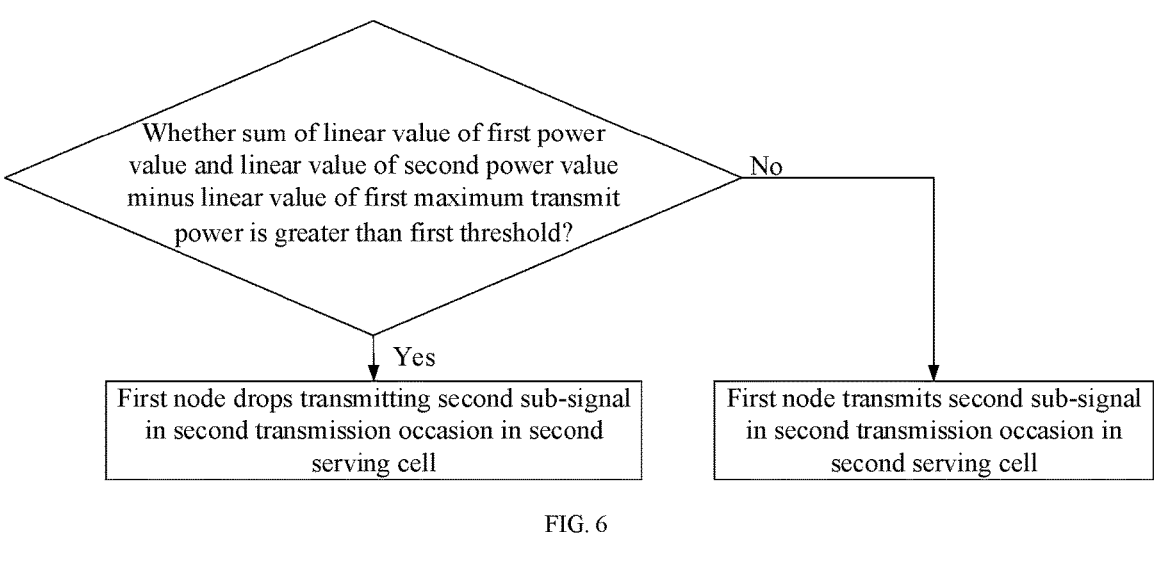
FIG. 6
Symbol in first time-domain resource ◄——► First type
FIG. 7
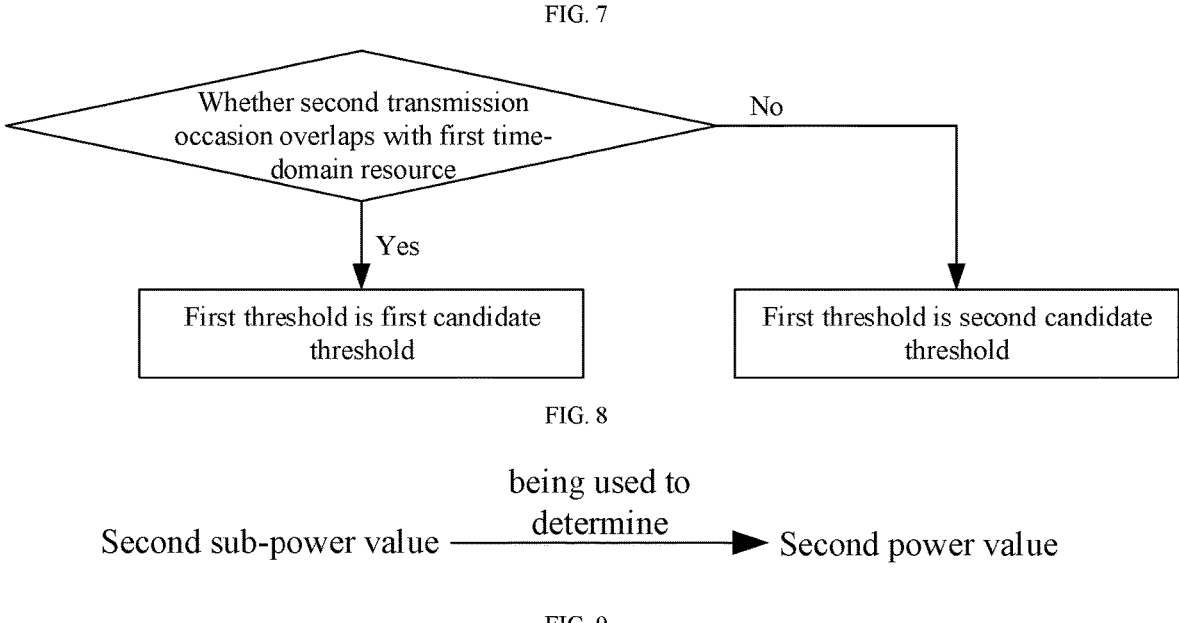
FIG. 8
Second sub-power value ——being used to determine——► Second power value
FIG. 9
Second sub-power value = min( second reference power value, second power threshold )
FIG. 10
First sub-power value ——being used to determine——► First power value
FIG. 11

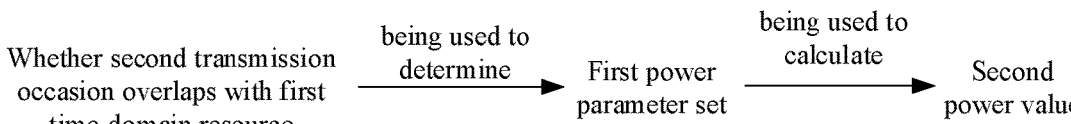

First sub-power value = min( first reference power value, first power threshold )

FIG. 12

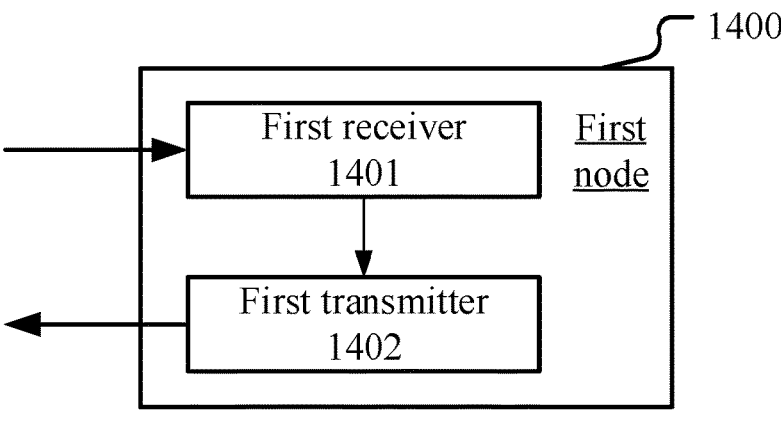

Whether second transmission occasion overlaps with first time-domain resource → being used to determine → First power parameter set → being used to calculate → Second power value

FIG. 13

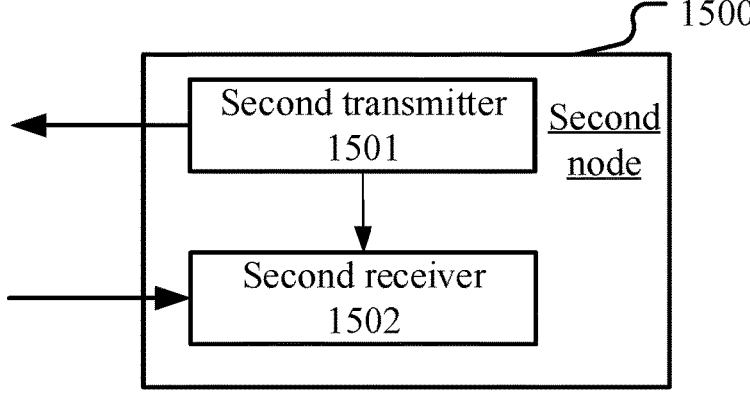

1400

First node

First receiver 1401

First transmitter 1402

Second node

Second transmitter 1501

Second receiver 1502

FIG. 15

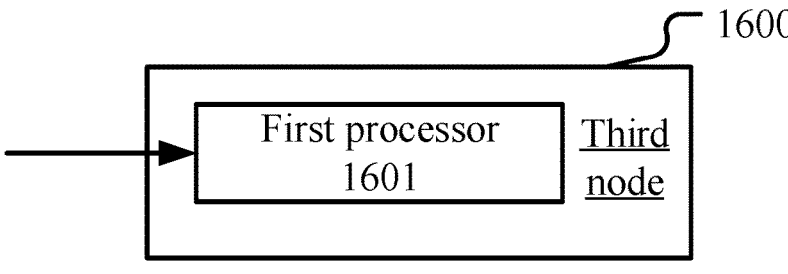

1600

Third node

First processor 1601

FIG. 16

METHOD AND DEVICE IN NODES USED FOR WIRELESS COMMUNICATION

CROSS REFERENCE TO RELATED APPLICATIONS

This application is the continuation of the international patent application No. PCT/CN2022/108193, filed on Jul. 27, 2022, and claims the priority benefit of Chinese Patent Application No. 202110869235.4, filed on Jul. 30, 2021, the full disclosure of which is incorporated herein by reference.

BACKGROUND

Technical Field

The present application relates to transmission methods and devices in wireless communication systems, and in particular to a transmission scheme and device for flexible transmission direction configuration in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct a study of New Radio (NR), or what is called fifth Generation (5G). A work Item (WI) of NR was approved at 3GPP RAN #75 plenary to standardize NR. It was decided at 3GPP RAN #86 plenary to start a Study Item (SI) and a Work Item (WI) for NR R-17 and it is expected that an SI and a WI for NR R-18 will be approved at 3GPP RAN #94e plenary.

Uplink power control is an important technical means for 3GPP Long-term Evolution (LTE) and NR systems. Uplink transmit power is regulated by open-loop and closed-loop methods to minimize the interference to other users while satisfying the received power requirements.

SUMMARY

In existing NR systems, spectrum resources are statically divided into FDD spectrum and TDD spectrum. For the TDD spectrum, both the base station and User Equipment (UE) work in half-duplex mode. This half-duplex mode avoids self-interference and can mitigate the impact of Cross Link interference, but also brings about a decrease in resource utilization and an increase in latency. For these problems, supporting flexible duplex mode or variable link orientation (up or down or flexible) on the TDD spectrum or FDD spectrum becomes a possible solution. At 3GPP RAN #88e meeting and 3GPP R-18 workshop, support for full-duplex communications in NR R-18 received a lot of attention and discussion.

The communications in full duplex mode will receive serious interference, comprising self-interference and cross-link interference. What effect this severe interference environment will have on uplink power control is a problem that needs to be addressed. To address the above problem, the present application provides a solution. It should be noted that although the above description uses full-duplex and cellular networks as examples, the present application is also applicable to other scenarios such as other flexible duplex modes or variable link orientation technologies, V2X (Vehicle-to-Everything) and sidelink transmission, where similar technical effects can be achieved. In addition, the use of a unified solution for different scenarios (including but not limited to full duplex, such as other flexible duplex modes or variable link orientation technologies, cellular networks, V2X and sub-link transmission) also helps to reduce hardware complexity and cost. If no conflict is incurred, embodiments in a first node in the present application and the characteristics of the embodiments are also applicable to any other node, and vice versa. And the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising: receiving a first signaling, the first signaling being used to determine a first time-domain resource;

transmitting a first signal in a first transmission occasion in a first cell group, the first cell group comprising at least one serving cell;

transmitting a second sub-signal in a second transmission occasion in a second serving cell, or, dropping transmitting a second sub-signal in a second transmission occasion in a second serving cell; the second serving cell being a serving cell in a second cell group;

herein, the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; whether the second transmission occasion overlaps with the first time-domain resource is used to determine the first threshold.

In one embodiment, a problem to be solved in the present application comprises: how to meet the uplink transmit power requirements of different duplex modes.

In one embodiment, characteristics of the above method comprise: determining a maximum reduction amplitude of transmit power of the second signal based on the duplex mode.

In one embodiment, advantages of the above method comprise: satisfying the demand for uplink transmit power in different duplex modes.

In one embodiment, advantages of the above method comprise: avoiding the failure to guarantee transmission performance in a heavily interfering environment in full duplex due to an excessive reduction of transmit power of the second signal.

According to one aspect of the present application, it is characterized in that the first signaling configure s a symbol in the first time-domain resource as a first type.

According to one aspect of the present application, comprising:

transmitting a third sub-signal in the second transmission occasion in a third serving cell;

herein, the second sub-signal is dropped to be transmitted in the second transmission occasion in the second serving cell; the third serving cell is a serving cell in the second cell group, and the second signal comprises the third sub-signal.

In one embodiment, advantages of the above method comprise: when total transmit power of the second cell group needs to be scaled down beyond the first threshold, there is no need to drop transmitting all radio signals in the second cell group, improving the efficiency of uplink transmission.

According to one aspect of the present application, comprising:

receiving a first information block;

herein, the first information block indicates a first candidate threshold and a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

According to one aspect of the present application, it is characterized in that transmit power of the second sub-signal is equal to a second sub-power value, and the second sub-power value is used to determine the second power value; the second sub-power value is equal to a minimum value between a second reference power value and a second power threshold.

According to one aspect of the present application, it is characterized in that the first signal comprises a first sub-signal, and transmit power of the first sub-signal is equal to a first sub-power value; the first sub-power value is used to determine the first power value; the first sub-power value is equal to a minimum value between a first reference power value and a first power threshold.

According to one aspect of the present application, it is characterized in that a first power parameter set is used to calculate the second power value; whether the second transmission occasion overlaps with the first time-domain resource is used to determine the first power parameter set.

In one embodiment, advantages of the above method comprise: flexibly adjusting uplink power control parameters according to the duplex mode to respectively meet different power requirements of full duplex and half duplex.

According to one aspect of the present application, it is characterized in that the first node is a UE.

According to one aspect of the present application, it is characterized in that the first node is a relay node.

The present application provides a method in a second node for wireless communications, comprising:

transmitting a first signaling, the first signaling being used to determine a first time-domain resource; and monitoring a second sub-signal in a second transmission occasion in a second serving cell, the second serving cell being a serving cell in a second cell group;

herein, a target receiver of the first signaling transmits a first signal in a first transmission occasion in a first cell group, the first cell group comprises at least one serving cell; the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; whether the second transmission occasion overlaps with the first time-domain resource is used to determine the first threshold.

According to one aspect of the present application, it is characterized in that the first signaling configures a symbol in the first time-domain resource as a first type.

According to one aspect of the present application, comprising:

monitoring and receiving a third sub-signal in the second transmission occasion in a third serving cell;

herein, the second sub-signal is dropped to be transmitted in the second transmission occasion in the second serving cell; the third serving cell is a serving cell in the second cell group, and the second signal comprises the third sub-signal.

According to one aspect of the present application, comprising:

transmitting a first information block;

herein, the first information block indicates a first candidate threshold and a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

According to one aspect of the present application, it is characterized in that transmit power of the second sub-signal is equal to a second sub-power value, and the second sub-power value is used to determine the second power value; the second sub-power value is equal to a minimum value between a second reference power value and a second power threshold.

According to one aspect of the present application, it is characterized in that a first power parameter set is used to calculate the second power value; whether the second transmission occasion overlaps with the first time-domain resource is used to determine the first power parameter set.

According to one aspect of the present application, it is characterized in that the second node is a base station.

According to one aspect of the present application, it is characterized in that the second node is a UE.

According to one aspect of the present application, it is characterized in that the second node is a relay node.

The present application provides a first node for wireless communications, comprising:

a first receiver, receiving a first signaling, the first signaling being used to determine a first time-domain resource; and a first transmitter, transmitting a first signal in a first transmission occasion in a first cell group, the first cell group comprising at least one serving cell; and the first transmitter, transmitting a second sub-signal in a second transmission occasion in a second serving cell, or, dropping transmitting a second sub-signal in a second transmission occasion in a second serving cell; the second serving cell being a serving cell in a second cell group;

herein, the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; whether the second transmission occasion overlaps with the first time-domain resource is used to determine the first threshold.

The present application provides a second node for wireless communications, comprising:

a second transmitter, transmitting a first signaling, the first signaling being used to determine a first time-domain resource; and a second receiver, monitoring a second sub-signal in a second transmission occasion in a second serving cell, the second serving cell being a serving cell in a second cell group;

herein, a target receiver of the first signaling transmits a first signal in a first transmission occasion in a first cell group, the first cell group comprises at least one serving cell; the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; whether the second transmission occasion overlaps with the first time-domain resource is used to determine the first threshold.

The present application provides a method in a third node for wireless communications, comprising:

receiving a first signal in a first transmission occasion in a first cell group, the first cell group comprising at least one serving cell;

herein, a transmitter of the first signal transmits or drops transmitting a second sub-signal in a second transmission occasion in a second serving cell; the second serving cell is a serving cell in a second cell group; the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; a first signaling is used to determine a first time-domain resource; whether the second transmission occasion overlaps with the first time-domain resource is used to determine the first threshold.

According to one aspect of the present application, it is characterized in that the first signaling configures a symbol in the first time-domain resource as a first type.

According to one aspect of the present application, it is characterized in that the first threshold is a first candidate threshold or a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

According to one aspect of the present application, comprising:

transmitting a first information block;

herein, the first information block indicates the first candidate threshold and the second candidate threshold.

According to one aspect of the present application, it is characterized in that the first signal comprises a first sub-signal, and transmit power of the first sub-signal is equal to a first sub-power value; the first sub-power value is used to determine the first power value; the first sub-power value is equal to a minimum value between a first reference power value and a first power threshold.

According to one aspect of the present application, it is characterized in that the third node is a base station.

According to one aspect of the present application, it is characterized in that the third node is a UE.

According to one aspect of the present application, it is characterized in that the third node is a relay node.

The present application provides a third node for wireless communications, comprising:

a first processor, receiving a first signal in a first transmission occasion in a first cell group, the first cell group comprising at least one serving cell;

herein, a transmitter of the first signal transmits or drops transmitting a second sub-signal in a second transmission occasion in a second serving cell; the second serving cell is a serving cell in a second cell group; the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; a first signaling is used to determine a first time-domain resource; whether the second transmission occasion overlaps with the first time-domain resource is used to determine the first threshold.

In one embodiment, the present application has the following advantages over conventional schemes:

adjusting a maximum reduction amplitude of the total uplink transmit power according to the duplex mode;

satisfying the demand for uplink transmit power in different duplex modes.

BRIEF DESCRIPTION OF THE DRAWINGS

Other features, objects and advantages of the present application will become more apparent from the detailed description of non-restrictive embodiments taken in conjunction with the following drawings:

FIG. 6 illustrates a schematic diagram of whether a sum of a linear value of a first power value and a linear value of a second power value minus a linear value of first maximum transmit power is greater than a first threshold being used to determine whether a second sub-signal is transmitted in a second serving cell in a second transmission occasion according to one embodiment of the present application;

FIG. 7 illustrates a schematic diagram of a first signaling configuring a symbol in a first time-domain resource as a first type according to one embodiment of the present application;

FIG. 8 illustrates a schematic diagram of whether a second transmission occasion overlaps with a first time-domain resource being used to determine a first threshold according to one embodiment of the present application;

FIG. 9 illustrates a schematic diagram of a second sub-power value being used to determine a second power value according to one embodiment of the present application;

FIG. 10 illustrates a schematic diagram of a second sub-power value according to one embodiment of the present application;

FIG. 11 illustrates a schematic diagram of a first sub-power value being used to determine a first power value according to one embodiment of the present application;

FIG. 12 illustrates a schematic diagram of a first sub-power value according to one embodiment of the present application;

FIG. 13 illustrates a schematic diagram of whether a second transmission occasion overlaps with a first time-domain resource being used to determine a first power parameter set according to one embodiment of the present application;

FIG. 14 illustrates a structure block diagram of a processor in a first node according to one embodiment of the present application;

FIG. 15 illustrates a structure block diagram of a processor in a second node according to one embodiment of the present application;

FIG. 16 illustrates a structure block diagram of a processor in a third node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

<center>Embodiment 1</center>

Figure 1:
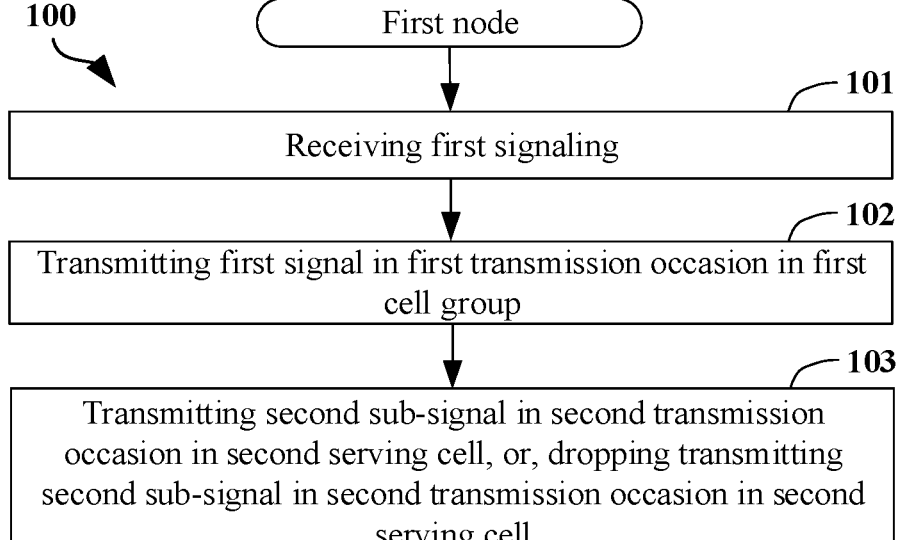
FIG. 1 illustrates a flowchart of a first signaling, a first signal and a second sub-signal according to one embodiment of the present application.

Embodiment 1 illustrates a flowchart of a first signaling, a second signal and a second sub-signal according to one embodiment of the present application, as shown in FIG. 1. In step 100 illustrated by FIG. 1, each box represents a step. and in particular, the order of steps in boxes does not represent chronological order of characteristics between the steps.

In Embodiment 1, the first node in the present application receives a first signaling in step 101, and the first signaling is used to determine a first time-domain resource; transmits a first signal in a first transmission occasion in a first cell group in step 102, the first cell group comprises at least one serving cell; transmits a second sub-signal in a second transmission occasion in a second serving cell in step 103, or, drops transmitting a second sub-signal in a second transmission occasion in a second serving cell; herein, the second serving cell is a serving cell in a second cell group; the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; whether the second transmission occasion overlaps with the first time-domain resource is used to determine the first threshold.

In one embodiment, the first signaling comprises a higher-layer signaling.

In one embodiment, the first signaling comprises a Radio Resource Control (RRC) signaling.

In one embodiment, the first signaling comprises information in all or partial fields in an Information Element (IE).

In one embodiment, the first signaling comprises information in all or partial fields in a TDD-UL-DL-ConfigCommon IE.

In one embodiment, the first signaling comprises information in all or partial fields in a TDD-UL-DL-ConfigDedicated IE.

In one embodiment, the first signaling is carried by an IE.

In one embodiment, a name of an IE carrying the first signaling comprises "TDD-UL-DL".

In one embodiment, a name of an IE carrying the first signaling comprises "TDD".

In one embodiment, the first signaling comprises a Medium Access Control layer Control Element (MAC CE).

In one embodiment, the first signaling comprises a physical-layer signaling.

In one embodiment, the first signaling comprises a layer 1 (L1) signaling.

In one embodiment, the first signaling comprises Downlink Control Information (DCI).

In one embodiment, the first signaling is DCI.

In one embodiment, the first signaling comprises one or multiple fields in a DCI.

In one embodiment, the first signaling is a DCI, and a format of the first signaling is DCI format 2_0.

In one embodiment, the first time-domain resource comprises at least one symbol.

In one embodiment, the first time-domain resource comprises one symbol.

In one embodiment, the first time-domain resource comprises multiple continuous symbols.

In one embodiment, the first time-domain resource comprises multiple discontinuous symbols.

In one embodiment, the first time-domain resource comprises at least one slot.

In one embodiment, the first time-domain resource comprises at least one subframe.

In one embodiment, the first signaling is not applicable to a serving cell in the first cell group.

In one embodiment, the first signaling is applicable to a serving cell in the first cell group and the second cell group.

In one embodiment, the first signaling is applicable to all serving cells in the second cell group.

In one embodiment, the first signaling is only applicable to a serving cell in the second cell group.

In one embodiment, the first signaling is only applicable to the second serving cell.

In one embodiment, the first signaling is only applicable to a BWP of the second serving cell.

In one embodiment, the first signaling is only applicable to a BWP occupied by the second sub-signal in the second serving cell.

In one embodiment, the first signaling is used to determine the first time-domain resource in the second cell group.

In one embodiment, the first signaling is used to determine the first time-domain resource in the second serving cell.

In one embodiment, a transmitter of the first signaling receives and transmits a radio signal in the first time-domain resource at the same time.

In one embodiment, a transmitter of the first signaling receives and transmits a radio signal in the second serving cell in the first time-domain resource at the same time.

In one embodiment, a transmitter of the first signaling receives and transmits a radio signal in a BWP in the second serving cell in the first time-domain resource at the same time.

In one embodiment, a transmitter of the first signaling receives and transmits a radio signal in a BWP occupied by the second sub-signal of the second serving cell in the first time-domain resource at the same time.

In one embodiment, the first signaling indicates the first time-domain resource.

In one embodiment, the first time-domain resource belongs to a first time-domain resource pool, and the first signaling indicates the first time-domain resource from the first time-domain resource pool.

In one embodiment, the first time-domain resource pool comprises multiple continuous symbols.

In one embodiment, the first time-domain resource pool comprises at least one slot.

In one embodiment, the first time-domain resource pool comprises at least one subframe.

In one embodiment, at least one symbol in the first time-domain resource pool does not belong to the first time-domain resource.

In one embodiment, the first signaling indicates: a transmitter of the first signaling receives and transmits a radio signal in the first time-domain resource at the same time.

In one embodiment, the first signaling indicates: a transmitter of the first signaling receives and transmits a radio signal in the first time-domain resource in the second serving cell at the same time.

In one embodiment, the first signaling indicates: a transmitter of the first signaling receives and transmits a radio signal in the first time-domain resource in a BWP in the second serving cell at the same time.

In one embodiment, the symbol comprises an Orthogonal Frequency Division Multiplexing (OFDM) symbol.

In one embodiment, the symbol comprises a Discrete Fourier Transform Spread OFDM (DFT-S-OFDM) symbol.

In one embodiment, the first cell group only comprises one serving cell.

In one embodiment, the first cell group comprises multiple serving cells.

In one embodiment, the second cell group comprises at least one serving cell.

In one embodiment, the second cell group only comprises the second serving cell.

In one embodiment, the second cell group comprises at least one serving cell other than the second serving cell.

In one embodiment, the first cell group and the second cell group are respectively a Master Cell Group (MCG) and a Secondary Cell Group (SCG).

In one subembodiment of the above embodiment, the first cell group comprises a Primary Cell (PCell) and optionally one or multiple Secondary Cells (SCells); the second cell group comprises one Primary Secondary Cell (PSCell) and optionally one or multiple SCells.

In one embodiment, the first cell group and the second cell group are respectively an SCG and an MCG.

In one subembodiment of the above embodiment, the first cell group comprises a PSCell and optionally one or multiple Secondary Cells (SCells); the second cell group comprises one PCell and optionally one or multiple SCells.

In one embodiment, there does not exist a serving cell that belongs to the first cell group and the second cell group simultaneously.

In one embodiment, each serving cell in the first cell group is maintained by a same MN, and each serving cell in the second cell group is maintained by a same SN.

In one subembodiment of the above embodiment, a target receiver of the first signal is the same MN.

In one subembodiment of the above embodiment, a target receiver of the second signal is the same SN.

In one embodiment, each serving cell in the first cell group is maintained by a same SN, and each serving cell in the second cell group is maintained by a same MN.

In one subembodiment of the above embodiment, a target receiver of the first signal is the same SN.

In one subembodiment of the above embodiment, a target receiver of the second signal is the same MN.

In one embodiment, the second serving cell is a Primary Cell (PCell).

In one embodiment, the second serving cell is a Primary secondary cell (PSCell).

In one embodiment, the second serving cell is a serving cell different from a PCell in the second cell group.

In one embodiment, the second serving cell is a serving cell different from a PSCell in the second cell group.

In one embodiment, the first cell group adopts Evolved Universal Terrestrial Radio Access (E-UTRA) radio access, and the second cell group adopts New Radio (NR) radio access.

In one embodiment, the first cell group adopts NR radio access, and the second cell group adopts E-UTRA radio access.

In one embodiment, the first cell group and second cell group both adopt E-UTRA radio access. In one embodiment, the first cell group and second cell group both adopt NR radio access.

In one embodiment, the first cell group and the second cell group are respectively an MCG and an SCG; the first cell group and the second cell group respectively E-UTRA radio access and NR radio access.

In one embodiment, the first node performs auxiliary serving cell addition for each serving cell in the first cell group and second cell group.

In one embodiment, each serving cell in the first cell group and second cell group is comprised in a sCellToAddModList or a sCellToAddModListSCG most recently received by the first node.

In one embodiment, the first node is assigned a SCellIndex or a ServCellIndex for each serving cell in the first cell group and second cell group.

In one embodiment, the SCellIndex is a positive integer not greater than 31.

In one embodiment, the ServCellIndex is non-negative integer not greater than 31.

In one embodiment, an RRC connection is established between the first node and each serving cell in the first cell group and the second cell group.

In one embodiment, an RRC connection is established between the first node and a serving cell in the first cell group and a serving cell in the second cell group respectively.

In one embodiment, the first cell group and second cell group are respectively assigned a Cell-Radio Network Temporary Identifier (C-RNTI) to the first node.

In one embodiment, any serving cell in the first cell group and any serving cell in the second cell group are orthogonal in frequency domain.

In one embodiment, there exists a serving cell in the first cell group that overlaps with a serving cell in the second cell group in frequency domain.

In one embodiment, any two serving cells in the first cell group are orthogonal in frequency domain.

In one embodiment, there exist two serving cells in the first cell group being overlapped in frequency domain.

In one embodiment, any two serving cells in the second cell group are orthogonal in frequency domain.

In one embodiment, there exist two serving cells in the second cell group being overlapped in frequency domain.

In one embodiment, the first transmission occasion is a continuous duration.

In one embodiment, the first transmission occasion comprises a slot.

In one embodiment, the first transmission occasion is a slot.

In one embodiment, the first transmission occasion comprises a subframe.

In one embodiment, the first transmission occasion is a subframe.

In one embodiment, the first transmission occasion comprises multiple slots.

In one embodiment, the first transmission occasion comprises multiple subframes.

In one embodiment, the first transmission occasion comprises at least one symbol.

In one embodiment, the first transmission occasion comprises multiple continuous symbols.

In one embodiment, the first signal occupies all time-domain resources in the first transmission occasion.

In one embodiment, the first signal only occupies partial time-domain resources in the first transmission occasion.

In one embodiment, the first signal does not occupy time-domain resources other than the first transmission occasion.

In one embodiment, the first signal occupies time-domain resources other than the first transmission occasion.

In one embodiment, the second transmission occasion is a continuous duration.

In one embodiment, the second transmission occasion comprises a slot.

In one embodiment, the second transmission occasion is a slot.

In one embodiment, the second transmission occasion comprises a subframe.

In one embodiment, the second transmission occasion is a subframe.

In one embodiment, the second transmission occasion comprises multiple slots.

In one embodiment, the second transmission occasion comprises multiple subframes.

In one embodiment, the second transmission occasion comprises at least one symbol.

In one embodiment, the second transmission occasion comprises multiple continuous symbols.

In one embodiment, the second sub-signal occupies all time-domain resources in the second transmission occasion.

In one embodiment, the second sub-signal only occupies partial time-domain resources in the second transmission occasion.

In one embodiment, the second sub-signal does not occupy time-domain resources other than the second transmission occasion.

In one embodiment, the second sub-signal occupies time-domain resources other than the second transmission occasion.

In one embodiment, the first transmission occasion overlaps with the second transmission occasion in time domain.

In one embodiment, the first sub-signal and the second signal respectively comprise a baseband signal.

In one embodiment, the first sub-signal and the second signal respectively comprise a radio signal.

In one embodiment, the first sub-signal and the second signal respectively comprise a radio frequency signal.

In one embodiment, a target receiver of the first signal is different from a target receiver of the second signal.

In one embodiment, a target receiver of the second signal is an MN, and a target receiver of the first signal is an SN.

In one embodiment, a target receiver of the first signal is an MN, and a target receiver of the second signal is an SN.

In one embodiment, a target receiver of the first signal is different from a transmitter of the first signaling.

In one embodiment, a target receiver of the first signal is a transmitter of the first signaling.

In one embodiment, a target receiver of the second signal is different from a transmitter of the first signaling.

In one embodiment, a target receiver of the second signal is a transmitter of the first signaling.

In one embodiment, the first signal comprises one or more of a signal transmitted in a Physical Random Access CHannel (PRACH), a signal transmitted in a Physical Uplink Shared CHannel (PUSCH), a signal transmitted in a Physical Uplink Control Channel (PUCCH) and a Sounding Reference Signal (SRS).

In one embodiment, the second signal only comprises the second sub-signal.

In one embodiment, the second signal comprises at least one other sub-signal other than the second sub-signal.

In one embodiment, the second sub-signal comprises one or more of a signal transmitted in a PRACH, a signal transmitted in a PUSCH, a signal transmitted in a PUCCH, and an SRS.

In one embodiment, the second sub-signal comprises one of a signal transmitted in a PRACH, a signal transmitted in a PUSCH, a signal transmitted in a PUCCH, and an SRS.

In one embodiment, the second sub-signal comprises one of a signal transmitted in a PUSCH, a signal transmitted in a PUCCH, and an SRS.

In one embodiment, the first signal overlaps with the second sub-signal in time domain.

In one embodiment, the first signal overlaps with the second signal in time domain.

In one embodiment, the first signal only comprises one sub-signal, and the sub-signal is transmitted on a serving cell in the first cell group.

In one subembodiment of the above embodiment, the sub-signal overlaps with the second sub-signal in time domain.

In one embodiment, the first signal comprises Q1 sub-signals, and the Q1 sub-signals are respectively transmitted on Q1 serving cells in the first cell, Q1 being a positive integer greater than 1.

In one embodiment, each of the Q1 sub-signals overlaps with the second sub-signal in time domain.

In one embodiment, time-domain resources occupied by any of the Q1 sub-signals belong to the first transmission occasion.

In one embodiment, time-domain resources occupied by any of the Q1 sub-signals overlap with the first transmission occasion.

In one embodiment, the Q1 sub-signals occupy a same slot.

In one embodiment, the Q1 sub-signals occupy a same subframe.

In one embodiment, the second signal comprises Q2 sub-signals, and the Q2 sub-signals are respectively transmitted on Q2 serving cells in the second cell group; the second sub-signal is one of the Q2 sub-signals, Q2 being a positive integer greater than 1.

In one embodiment, any of the Q1 sub-signals overlaps with any of the Q2 sub-signals in time domain.

In one embodiment, time-domain resources occupied by any of the Q2 sub-signals belong to the second transmission occasion.

In one embodiment, time-domain resources occupied by any of the Q2 sub-signals overlap with the second transmission occasion.

In one embodiment, the Q2 sub-signals occupy a same slot.

In one embodiment, the Q2 sub-signals occupy a same subframe.

In one embodiment, the first power value is measured by dBm, and the second power value is measured by dBm.

In one embodiment, a linear value of the first power value is equal to $x1$ power of 10, and $x1$ is equal to the first power value divided by 10; a linear value of the second power value is equal to $x2$ power of 10, and $x2$ is equal to the second power value divided by 10.

In one embodiment, actual transmit power of the first signal is equal to the first power value, and expected transmit power of the second signal is equal to the second power value.

In one embodiment, actual transmit power of the first signal is equal to the first power value, and unreduced transmit power of the second signal is equal to the second power value.

In one embodiment, actual transmit power of the second signal is equal to the second power value.

In one embodiment, actual transmit power of the second signal is less than the second power value.

In one embodiment, a linear value of actual transmit power of the second signal is less than or equal to a linear value of the first maximum transmit power minus a linear value of the first power value.

In one embodiment, when a sum of a linear value of the first power value and a linear value of the second power value minus a linear value of the first maximum transmit power is not greater than the first threshold, a linear value of actual transmit power of the second signal is equal to a linear value of the first maximum transmit power minus a linear value of the first power value.

In one embodiment, the first power value and the second power value are respectively calculated according to methods in chapters 7.1-7.5 of 3GPP TS38.213.

In one embodiment, the first signal is transmitted with equal power in the first transmission occasion.

In one embodiment, transmit power of the first signal changes in the first transmission occasion.

In one embodiment, transmit power of the first signal in any part of the first transmission occasion is less than or equal to the first power value.

In one embodiment, maximum transmit power of the first signal in the first transmission occasion is equal to the first power value.

In one embodiment, the second signal is transmitted with equal power in the second transmission occasion.

In one embodiment, transmit power of the second signal changes in the second transmission occasion.

In one embodiment, transmit power of the second signal in any part of the second transmission occasion is less than or equal to the second power value.

In one embodiment, maximum transmit power of the second signal in the second transmission occasion is equal to the second power value.

In one embodiment, expected transmit power of the second signal in any part of the second transmission occasion is less than or equal to the second power value.

In one embodiment, unreduced transmit power of the second signal in any part of the second transmission occasion is less than or equal to the second power value.

In one embodiment, maximum expected transmit power of the second signal in the second transmission occasion is equal to the second power value.

In one embodiment, a maximum value of unreduced transmit power of the second signal in the second transmission occasion is equal to the second power value.

In one embodiment, a sum of a linear value of actual transmit power of the second signal in any part of the second transmission occasion and a linear value of the first power value is less than or equal to a linear value of the first maximum transmit power.

In one embodiment, the first power value is total transmit power of the first node in the first transmission occasion in the first cell group; the second power value is total transmit power of the first node in the second transmission occasion in the second cell group.

In one embodiment, the first power value is total transmit power of the first node in the first transmission occasion in the first cell group; the second power value is unreduced total transmit power of the first node in the second transmission occasion in the second cell group.

In one embodiment, a sum of a linear value of actual total transmit power of the first node in any part of the second transmission occasion in the second cell group and a linear value of the first power value is less than or equal to a linear value of the first maximum transmit power.

In one embodiment, the first power value is less than or equal to second maximum transmit power.

In one embodiment, the second maximum transmit power is measured by dBm.

In one embodiment, the second maximum transmit power is configurable.

In one embodiment, the second maximum transmit power is a fixed constant (i.e. not configurable).

In one embodiment, the second maximum transmit power is $P_{CMAX}(i)$, and the first transmission occasion is a transmission occasion i.

In one embodiment, the second maximum transmit power is specific to the first cell group.

In one embodiment, the second maximum transmit power is not less than a first reference threshold and not greater than a second reference threshold.

In one subembodiment of the above embodiment, the first reference threshold and the second reference threshold are configured.

In one subembodiment of the above embodiment, the first reference threshold and second reference threshold are respectively related to power class of the first node.

In one embodiment, the second power value is less than or equal to third maximum transmit power.

In one embodiment, the third maximum transmit power is measured by dBm.

In one embodiment, the third maximum transmit power is configurable.

In one embodiment, the third maximum transmit power is a fixed constant (i.e. not configurable).

In one embodiment, the third maximum transmit power is $P_{CMAX}(i)$, and the second transmission occasion is a transmission occasion i.

In one embodiment, the third maximum transmit power is specific to the second cell group.

In one embodiment, the third maximum transmit power is not less than a third reference threshold and not greater than a fourth reference threshold.

In one subembodiment of the above embodiment, the third reference threshold and the fourth reference threshold are configured.

In one subembodiment of the above embodiment, the third reference threshold and the fourth reference threshold are respectively related to power class of the first node.

In one embodiment, the first maximum transmit power is configurable.

In one embodiment, the first maximum transmit power is a fixed constant (i.e. not configurable).

In one embodiment, the first maximum transmit power is maximum transmit power configured for dual connectivity.

In one embodiment, the first maximum transmit power is measured by dBm.

In one embodiment, the first maximum transmit power is equal to a sum of a first power component and a second power component, the first power component is configurable, and the second power component is a fixed constant.

In one subembodiment of the above embodiment, the first power component is related to power class of the first node.

In one subembodiment of the above embodiment, the first power component is equal to a minimum value of a first sub-component and a second sub-component, the first sub-component is configured by RRC, and the second sub-component is related to power class of the first node.

In one embodiment, the first maximum transmit power is $$P_{Total}^{EN-DC}.$$

In one embodiment, the first maximum transmit power is $$P_{Total}^{NE-DC}.$$

In one embodiment, the first maximum transmit power is $$P_{Total}^{NR-DC}.$$

In one embodiment, for definition of $$P_{Total}^{EN-DC}, P_{Total}^{NE-DC}, \text{ and } P_{Total}^{NR-DC}$$

refer to chapter 7.6 of 3GPP TS38.213. In one embodiment, the first threshold is a non-negative real number.

In one embodiment, the first threshold is a non-negative integer.

In one embodiment, the first threshold is configurable.

In one embodiment, the first threshold is measure by dB.

In one embodiment, the first threshold is a linear value.

In one embodiment, the first threshold is $X_{SCALE}$.

In one embodiment, for definition of $X_{SCALE}$, refer to chapter 7.6 of 3GPP TS38.213.

In one embodiment, the first threshold is configured by RRC.

In one embodiment, the first threshold is configured by an IE.

In one embodiment, a dB value of the first threshold is configured by RRC.

In one embodiment, a dB value of the first threshold is configured by an IE.

In one embodiment, a name of an IE configuring the first threshold comprises "PhysicalCellGroupConfig".

In one embodiment, a name of an IE configuring the first threshold comprises "CellGroupConfig".

In one embodiment, the phrase that whether a sum of a linear value of the first power value and a linear value of the second power value minus a linear value of first maximum transmit power is greater than a first threshold refers to: whether a sum of a linear value of the first power value and a linear value of the second power value minus a linear value of the first maximum transmit power is greater than a linear value of the first threshold, and the first threshold is measured by dB.

Embodiment 2

Figure 2:
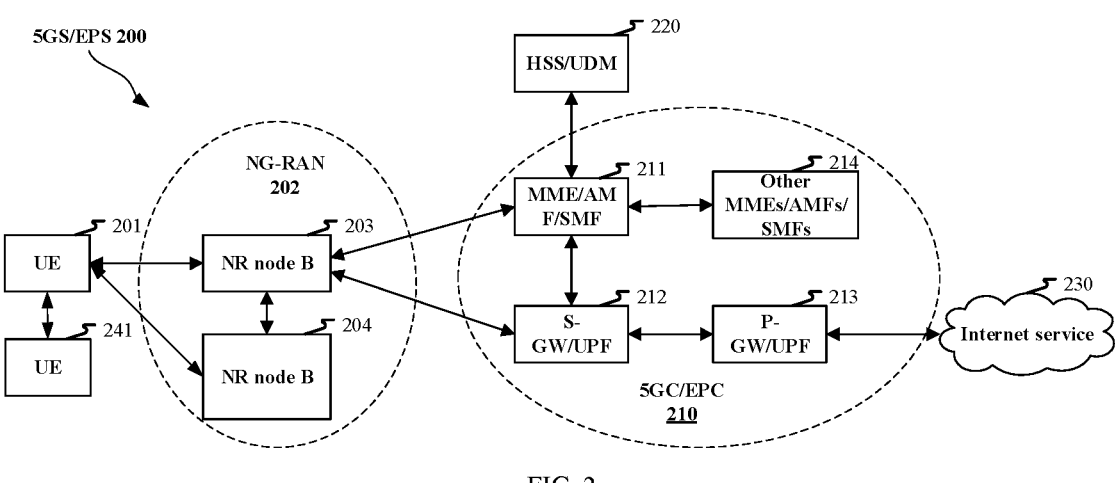
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 204 provides UE 201-oriented user plane protocol terminations. The gNB 203 or the gNB 204 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an SUNG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Services.

In one embodiment, the first node in the present application comprises the UE 201.

In one embodiment, the second node in the present application comprises the gNB 203.

In one embodiment, the second node in the present application comprises the gNB 204.

In one embodiment, the third node in the present application comprises the gNB 203.

In one embodiment, the third node in the present application comprises the gNB 204.

In one embodiment, a radio link between the UE 201 and the gNB 203 is a cellular network link.

In one embodiment, a transmitter of the first signaling comprises the gNB 203 or the gNB 204.

In one embodiment, a receiver of the first signaling comprises the UE 201.

In one embodiment, a transmitter of the first signal comprises the UE 201.

In one embodiment, a receiver of the first signaling comprises the gNB 203 or the gNB 204.

In one embodiment, a transmitter of the second sub-signal comprises the UE 201.

In one embodiment, a receiver of the second sub-signal comprises the gNB 203 or the gNB 204.

In one embodiment, the UE 201 supports dual connectivity.

Embodiment 3

Figure 3:
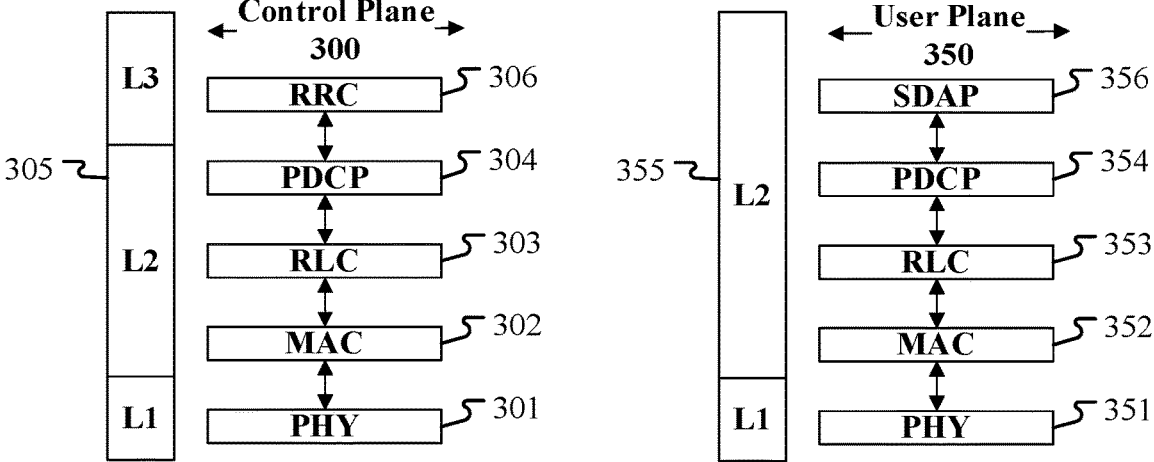
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to one embodiment of the present application, as shown in FIG. 3.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the first signaling is generated by the PHY 301 or the PHY 351.

In one embodiment, the first signaling is generated by the MAC sublayer 302 or the MAC sublayer 352.

In one embodiment, the first signaling is generated by the RRC sublayer 306.

In one embodiment, the first signal is generated at the PHY 301 or the PHY 351.

In one embodiment, the second sub-signal is generated by the PHY 301 or the PHY 351.

In one embodiment, the third sub-signal is generated by the PHY 301 or the PHY 351.

In one embodiment, the first information block is generated by the RRC sublayer 306.

Embodiment 4

Figure 4:
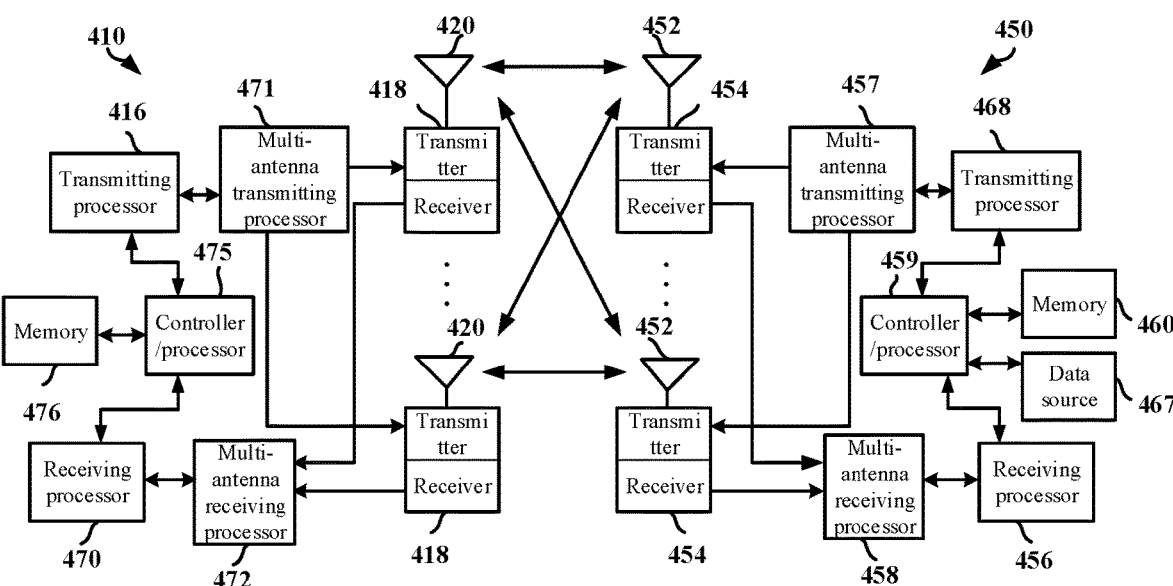
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling; transmits the first signal in the first transmission occasion in the first cell group; transmits or drops transmitting the second sub-signal in the second transmission occasion in the second serving cell.

In one embodiment, the second communication device 450 comprises a memory that stores a computer readable instruction program. The computer readable instruction program generates an action when executed by at least one processor. The action includes: receiving the first signaling; and transmitting the first signal in the first transmission occasion in the first cell group; transmitting or dropping transmitting the second sub-signal in the second transmission occasion in the second serving cell.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling; monitors the second sub-signal in the second transmission occasion in the second serving cell.

In one embodiment, the first communication device 410 comprises a memory that stores a computer readable instruction program. The computer readable instruction program generates an action when executed by at least one processor. The action includes: transmitting the first signaling; monitoring the second sub-signal in the second transmission occasion in the second serving cell.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: receives the first signal in the first transmission occasion in the first cell group.

In one embodiment, the first communication device 410 comprises a memory that stores a computer readable instruction program. The computer readable instruction program generates an action when executed by at least one processor. The action includes: receiving the first signal in the first transmission occasion in the first cell group.

In one embodiment, the first node comprises the second communication device 450 in the present application.

In one embodiment, the second node in the present application comprises the first communication device 410.

In one embodiment, the third node in the present application comprises the first communication device 410.

In one embodiment, at least one of the antenna 452, the receiver 454, the receiving processor 456, the multi-antenna receiving processor 458, the controller/processor 459, the memory 460, or the data source 467 is used to receive the first signaling; at least one of the antenna 420, the transmitter 418, the transmitting processor 416, the multi-antenna transmitting processor 471, the controller/processor 475, or the memory 476 is used to transmit the first signaling.

In one embodiment, at least one of the antenna 420, the receiver 418, the receiving processor 470, the multi-antenna receiving processor 472, the controller/processor 475, or the memory 476 is used to receive the first signal in the first transmission occasion in the first cell group; at least one of the antenna 452, the transmitter 454, the transmitting processor 468, the multi-antenna transmitting processor 457, the controller/processor 459, the memory 460, or the data source 467 is used to transmit the first signal in the first transmission occasion in the first cell group.

In one embodiment, at least one of the antenna 420, the receiver 418, the receiving processor 470, the multi-antenna receiving processor 472, the controller/processor 475, or the memory 476 is used to receive the second sub-signal in the second transmission occasion in the second serving cell; at least one of the antenna 452, the transmitter 454, the transmitting processor 468, the multi-antenna transmitting processor 457, the controller/processor 459, the memory 460, or the data source 467 is used to transmit the second sub-signal in the second transmission occasion in the second serving cell.

In one embodiment, at least one of the antenna 420, the receiver 418, the receiving processor 470, the multi-antenna receiving processor 472, the controller/processor 475, or the memory 476 is used to receive the third sub-signal in the second transmission occasion in the second serving cell; at least one of the antenna 452, the transmitter 454, the transmitting processor 468, the multi-antenna transmitting processor 457, the controller/processor 459, the memory 460, or the data source 467 is used to transmit the third sub-signal in the second transmission occasion in the second serving cell.

In one embodiment, at least one of the antenna 452, the receiver 454, the receiving processor 456, the multi-antenna receiving processor 458, the controller/processor 459, the memory 460, or the data source 467 is used to receive the first information block in the present application; at least one of the antenna 420, the transmitter 418, the transmitting processor 416, the multi-antenna transmitting processor 471, the controller/processor 475, or the memory 476 is used to transmit the first information block.

Embodiment 5

Figure 5:
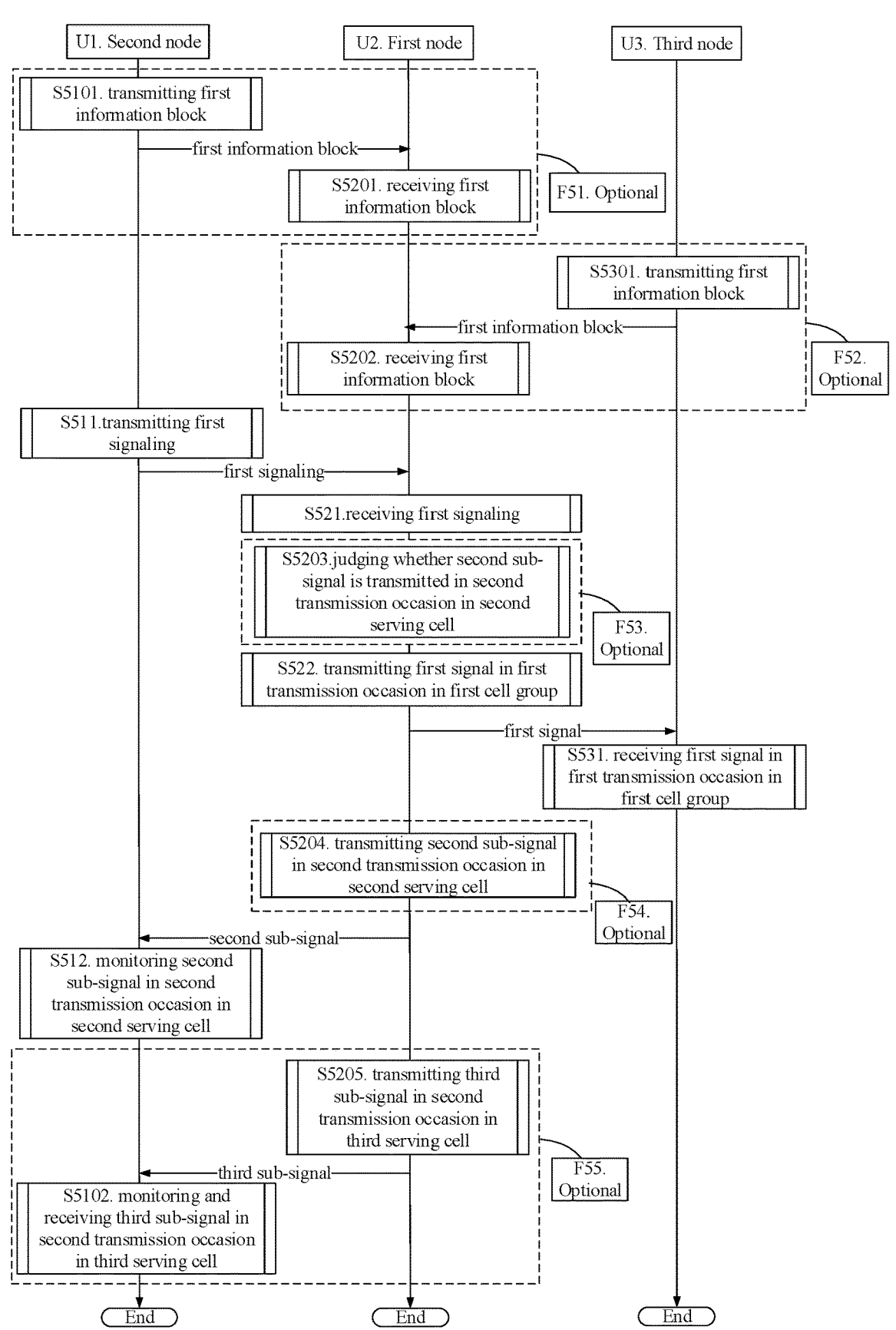
FIG. 5 illustrates a flowchart of wireless transmission according to one embodiment of the present application.

Embodiment 5 illustrates a flowchart of wireless transmission according to one embodiment of the present application, as shown in FIG. 5. In FIG. 5, the second node U1, the first node U2, and the third node U3 are respectively communication nodes, the transmission between the second node U1 and the first node U2, as well as between the third node U3 and the first node U2, is carried out through an air interface. In FIG. 5, steps in boxes F51 to F55 are respectively optional, and steps in boxes F51 and F52 cannot exist at the same time.

The second node U1 transmits a first information block in step S5101; transmits a first signaling in step S511; monitors a second sub-signal in a second transmission occasion in a second serving cell in step S512; monitors and receives a third sub-signal in the second transmission occasion in a third serving cell in step S5102.

The first node U2 receives a first information block in step S5201; receives a first information block in step S5202; receives a first signaling in step S521; judges whether a second sub-signal is transmitted in a second transmission occasion in a second serving cell in step S5203; transmits a first signal in a first transmission occasion in a first cell group in step S522; transmits the second sub-signal in the second transmission occasion in the second serving cell in step S5204; transmits a third sub-signal in the second transmission occasion in a third serving cell in step S5205.

The third node U3 transmits a first information block in step S5301; receives a first signal in a first transmission occasion in a first cell group in step S531.

In embodiment 5, the first signaling is used by the first node U2 to determine a first time-domain resource; the first cell group comprises at least one serving cell; the second serving cell is a serving cell in a second cell group; the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted by the first node U2 in the second transmission occasion in the second serving cell; when a sum of a linear value of the first power value and a linear value of the second power value minus a linear value of the first maximum transmit power is not greater than the first threshold, the second sub-signal is transmitted by the first node U2 in the second transmission occasion in the second serving cell; whether the second transmission occasion overlaps with the first time-domain resource is used by the first node U2 to determine the first threshold.

In one embodiment, the first node U2 is the first node in the present application.

In one embodiment, the second node U1 is the second node in the present application.

In one embodiment, the third node U3 is the third node in the present application.

In one embodiment, an air interface between the second node U1 and the first node U2 comprises a radio interface between a base station and a UE.

In one embodiment, an air interface between the second node U1 and the first node U2 comprises a radio interface between UEs.

In one embodiment, an air interface between the third node U3 and the first node U2 comprises a radio interface between a base station and a UE.

In one embodiment, an air interface between the third node U3 and the first node U2 comprises a radio interface between UEs.

In one embodiment, the second node U1 is a serving cell maintenance base station of the first node U2.

In one embodiment, the third node U3 is a serving cell maintenance base station of the first node U2.

In one embodiment, the second node is a maintenance base station of each serving cell in the second cell group.

In one embodiment, the second node is not a maintenance base station of any serving cell in the first cell group.

In one embodiment, the second cell group is an MCG, and the second node is an MN.

In one embodiment, the second cell group is an SCG, and the second node is an SN.

In one embodiment, the third node is a maintenance base station of each serving cell in the first cell group.

In one embodiment, the third node is not a maintenance base station of any serving cell in the second cell group.

In one embodiment, the first cell group is an MCG, and the third node is an MN.

In one embodiment, the first cell group is an SCG, and the third node is an SN.

In one embodiment, the monitoring comprises blind decoding, that is, a signal is received and decoding operation is performed; if a Cyclic Redundancy Check (CRC) bit determines that the decoding is correct, it is judged that the second sub-signal is received; otherwise it is judged that the second sub-signal is not received.

In one embodiment, the monitoring comprises a coherent detection, that is, coherent reception is performed and energy of a signal acquired after the coherent reception is measured; if energy of the signal is greater than a first given threshold, it is judged that the second sub-signal is received; if energy of the signal is less than the first given threshold, it is judged that the second sub-signal is not received.

In one embodiment, the monitoring comprises energy detection, that is, energy of a radio signal is sensed and is averaged to acquire received energy; if the received energy is greater than a second given threshold, it is judged that the second sub-signal is received; if the received energy is less than the second given threshold, it is judged that the second sub-signal is not received.

In one embodiment, the meaning of the phrase of monitoring a second sub-signal comprises: determining whether the second sub-signal is transmitted according to CRC; not determining whether the second sub-signal is transmitted before judging whether decoding is correct according to the CRC.

In one embodiment, the meaning of the phrase of monitoring a second sub-signal comprises: determining whether the second sub-signal is transmitted according to coherent detection; not determining whether the second sub-signal is transmitted before the coherent detection.

In one embodiment, the meaning of the phrase of monitoring a second sub-signal comprises: determining whether the second sub-signal is transmitted according to energy detection; not determining whether the second sub-signal is transmitted before the energy detection.

In one embodiment, the second node receives the second sub-signal in the second transmission occasion in the second serving cell.

In one embodiment, the second node does not receive the second sub-signal in the second transmission occasion in the second serving cell.

In one embodiment, steps in box F54 in FIG. 5 exist; the first node transmits the second sub-signal in the second transmission occasion in the second serving cell.

In one embodiment, steps in box F54 in FIG. 5 do not exist; the first node drops transmitting the second sub-signal in the second transmission occasion in the second serving cell.

In one subembodiment of the above embodiment, the first node drops transmitting the second signal in the second transmission occasion in the second serving cell.

In one embodiment, the first signaling is transmitted on a downlink physical layer data channel (i.e., a downlink channel capable of bearing physical layer data).

In one embodiment, the first signaling is transmitted on a Physical Downlink Shared CHannel (PDSCH).

In one embodiment, the first signaling is transmitted on a downlink physical layer control channel (i.e., a downlink channel only capable of bearing a physical-layer signaling).

In one embodiment, the first signaling is transmitted on a Physical Downlink Control Channel (PDCCH).

In one embodiment, a physical channel occupied by the first signal comprises one of multiple of a PRACH, a PUSCH or a PUCCH.

In one embodiment, a physical channel occupied by the second sub-signal comprises one of a PRACH, a PUSCH or a PUCCH.

In one embodiment, a physical channel occupied by the second signal comprises one of multiple of a PRACH, a PUSCH or a PUCCH.

In one embodiment, steps in box F51 in FIG. 5 exist, and steps in box F52 do not exist; the first information block indicates a first candidate threshold and a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

In one embodiment, steps in box F52 in FIG. 5 exist, and steps in box F51 do not exist; the first information block indicates a first candidate threshold and a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

In one embodiment, the first information block is carried by a higher-layer signaling.

In one embodiment, the first information block is carried by an RRC signaling.

In one embodiment, the first information block is carried by a MAC CE signaling.

In one embodiment, the first information block comprises information in all or partial fields in an IE.

In one embodiment, the first information block comprises information in different fields in an IE.

In one embodiment, the first information block is carried by an IE.

In one embodiment, the first information block is carried by two different IEs.

In one embodiment, a name of an IE carrying the first information block comprises "PhysicalCellGroupConfig".

In one embodiment, a name of an IE carrying the first information block comprises "CellGroupConfig".

In one embodiment, the first information block is earlier than the first signaling in time domain.

In one embodiment, the first information block is later than the first signaling in time domain.

In one embodiment, the first information block is transmitted on a PD SCH.

In one embodiment, steps in box F53 in FIG. 5 exist, the method in a first node for wireless communications comprises: judging whether the second sub-signal is transmitted in the second serving cell in the second transmission occasion.

In one embodiment, the first node judges whether the second sub-signal is transmitted in the second transmission occasion in the second serving cell based on a size relation between a sum of a linear value of the first power value and a linear value of the second power value minus a linear value of the first maximum transmit power and the first threshold.

In one embodiment, steps in the box marked by F55 in FIG. 5 exist, and steps in the box marked by F54 do not exist. the second sub-signal is dropped to be transmitted in the second transmission occasion in the second serving cell; the third serving cell is a serving cell in the second cell group, and the second signal comprises the third sub-signal.

In one embodiment, the second sub-signal and the third sub-signal respectively comprise a baseband signal.

In one embodiment, the second sub-signal and the third sub-signal respectively comprise a radio signal.

In one embodiment, the second sub-signal and the third sub-signal respectively comprise a radio frequency signal.

In one embodiment, the third sub-signal comprises one of a signal transmitted in a PRACH, a signal transmitted in a PUSCH, a signal transmitted in a PUCCH, and an SRS.

In one embodiment, a priority of the third sub-signal is higher than the second sub-signal.

In one subembodiment of the above embodiment, according to priority order in chapter 7.5 of 3GPP TS38.213, a priority of the third sub-signal is higher than a priority of the second sub-signal.

In one embodiment, the third serving cell is different from the second serving cell.

In one embodiment, the third serving cell and the second serving cell correspond to different SCellIndexes.

In one embodiment, the third serving cell and the second serving cell correspond to different ServCellIndexes.

In one embodiment, the third serving cell is different from the second serving cell, and the first signaling is only applicable to the second serving cell.

In one embodiment, the third serving cell is a PCell of the second cell group.

In one embodiment, the third serving cell is a PSCell of the second cell group.

In one embodiment, the third serving cell is a serving cell different from a PCell in the second cell group.

In one embodiment, the third serving cell is a serving cell different from a PSCell in the second cell group.

In one embodiment, the third sub-signal is transmitted on a BWP other than a BWP occupied by the second sub-signal.

In one embodiment, the third sub-signal is transmitted on a BWP other than a BWP occupied by the second sub-signal, and the first signaling is only applicable to the BWP occupied by the second sub-signal.

In one embodiment, the third sub-signal occupies all time-domain resources in the second transmission occasion.

In one embodiment, the third sub-signal only occupies partial time-domain resources in the second transmission occasion.

In one embodiment, the third sub-signal does not occupy time-domain resources other than the second transmission occasion.

In one embodiment, the third sub-signal occupies time-domain resources other than the second transmission occasion.

In one embodiment, a physical channel occupied by the third sub-signal comprises one of a PRACH, a PUSCH or a PUCCH.

Embodiment 6

Embodiment 6 illustrates a schematic diagram of whether a sum of a linear value of a first power value and a linear value of a second power value minus a linear value of first maximum transmit power is greater than a first threshold being used to determine whether a second sub-signal is transmitted in a second serving cell in a second transmission occasion according to one embodiment of the present application, as shown in FIG. 6. In embodiment 6, when a sum of a linear value of the first power value and a linear value of the second power value minus a linear value of the first maximum transmit power is greater than the first threshold, the first node drops transmitting the second sub-signal in the second transmission occasion in the second serving cell; when a sum of a linear value of the first power value and a linear value of the second power value minus a linear value of the first maximum transmit power is not greater than the first threshold, the first node transmits the second sub-signal in the second transmission occasion in the second serving cell.

In one embodiment, if a sum of a linear value of the first power value and a linear value of the second power value minus a linear value of the first maximum transmit power is greater than the first threshold, the second sub-signal is dropped to be transmitted in the second transmission occasion in the second serving cell; if a sum of a linear value of the first power value and a linear value of the second power value minus a linear value of the first maximum transmit power is not greater than the first threshold, the second sub-signal is transmitted in the second transmission occasion in the second serving cell.

In one embodiment, whether a sum of a linear value of the first power value and a linear value of the second power value minus a linear value of the first maximum transmit power is greater the first threshold is used by the first node to determine whether a second signal is transmitted in the second cell group in the second transmission occasion.

In one embodiment, when a sum of a linear value of the first power value and a linear value of the second power value minus a linear value of the first maximum transmit power is greater than the first threshold, the first node drops transmitting the second signal in the second transmission occasion in the second cell group.

In one embodiment, the second signal comprises at least one other sub-signal other than the second sub-signal; when a sum of a linear value of the first power value and a linear value of the second power value minus a linear value of the first maximum transmit power is greater than the first threshold, the first node drops transmitting all sub-signals in the second signal in the second transmission occasion.

In one embodiment, the second signal comprises at least one other sub-signal other than the second sub-signal; when a sum of a linear value of the first power value and a linear value of the second power value minus a linear value of the first maximum transmit power is greater than the first threshold, the first node drops transmitting all or partial sub-signals in the second signal in the second transmission occasion.

In one embodiment, when a sum of a linear value of the first power value and a linear value of the second power value minus a linear value of the first maximum transmit power is not greater than the first threshold, the first node transmits the second signal in the second transmission occasion in the second cell group.

In one embodiment, the second signal comprises at least one other sub-signal other than the second sub-signal; when a sum of a linear value of the first power value and a linear value of the second power value minus a linear value of the first maximum transmit power is not greater than the first threshold, the first node transmits all sub-signals in the second signal in the second transmission occasion.

In one embodiment, when a sum of a linear value of the first power value and a linear value of the second power value minus a linear value of the first maximum transmit power is greater than the first threshold, the first node drops transmitting a radio signal in the second transmission occasion in the second cell group.

Embodiment 7

Embodiment 7 illustrates a schematic diagram of a first signaling configuring a symbol in a first time-domain resource as a first type according to one embodiment of the present application, as shown in FIG. 7.

In one embodiment, the first signaling configures a symbol in the first time-domain resource as the first type in the second cell group.

In one embodiment, the first signaling configures a symbol in the first time-domain resource as the first type in the second serving cell.

In one embodiment, the first signaling configures a symbol in the first time-domain resource as the first type in a BWP of the second serving cell.

In one embodiment, the first signaling configures a symbol in the first time-domain resource as the first type in a BWP occupied by the second sub-signal of the second serving cell.

In one embodiment, for any symbol in the first time-domain resource, at least one serving cell of the first signaling in the second cell group configures the any symbol as the first type.

In one embodiment, for any symbol in the first time-domain resource, the first signaling configures the any symbol as the first type in at least one BWP of at least one serving cell in the second cell group.

In one embodiment, the meaning of the phrase of configuring a symbol in the first time-domain resource as a first type comprises: configuring each symbol in the first time-domain resource as the first type.

In one embodiment, the meaning of the phrase of configuring a symbol in the first time-domain resource as a first type comprises: configuring at least one symbol in the first time-domain resource as the first type.

In one embodiment, the meaning of the phrase of configuring a symbol in the first time-domain resource as a first type comprises: configuring a type of a symbol in the first time-domain resource as the first type.

In one embodiment, the meaning of the phrase of configuring a symbol in the first time-domain resource as a first type comprises: configuring a type of each symbol in the first time-domain resource as the first type.

In one embodiment, the meaning of the phrase that the first signaling is used to determine a first time-domain resource comprises: the first signaling configures a symbol in the first time-domain resource as the first type.

In one embodiment, the meaning of the phrase that the first signaling is used to determine a first time-domain resource comprises: the first signaling configures each symbol in the first time-domain resource as the first type.

In one embodiment, the meaning of the phrase that the first signaling is used to determine a first time-domain resource comprises: the first signaling indicates a type of each symbol in the first time-domain resource.

In one embodiment, the meaning of the phrase that the first signaling is used to determine a first time-domain resource comprises: the first signaling indicates that a type of each symbol in the first time-domain resource as the first type.

In one embodiment, if a symbol is configured as the first type, a transmitter of the first signaling receives and transmits a radio signal on the symbol at the same time; if a symbol is not configured as the first type, a transmitter of the first signaling only receives a radio signal or only transmits a radio signal on the symbol.

In one embodiment, the first type is a type in a first type set, any symbol is configured as a type in the first type set, and types in the first type set comprise the first type, uplink and downlink.

In one subembodiment of the above embodiment, types in the first type set comprises flexible.

In one embodiment, the first type is different from uplink and downlink.

In one embodiment, the first type is different from uplink, downlink and flexible.

In one embodiment, the meaning of the phrase of whether the second transmission occasion overlaps with the first time-domain resource comprises: whether there exists a symbol in the second transmission occasion being configured as the first type.

In one embodiment, if the second transmission occasion overlaps with the first time-domain resource, at least one symbol in the second transmission occasion is configured as the first type; if the second transmission occasion does not overlap with the first time-domain resource, each symbol in the second transmission occasion is not configured as the first type.

In one embodiment, if the second transmission occasion does not overlap with the first time-domain resource, the second transmission occasion is orthogonal with the first time-domain resource in time domain.

In one embodiment, the first time-domain resource belongs to a first time-domain resource pool, the first signaling indicates the first time-domain resource from the first time-domain resource pool, and configures a symbol in the first time-domain resource as the first type.

In one subembodiment of the above embodiment, the first signaling indicates that only symbols in the first time-domain resource in the first time-domain resource pool are configured as the first type.

Embodiment 8

Embodiment 8 illustrates a schematic diagram of whether a second transmission occasion overlaps with a first time-domain resource being used to determine a first threshold according to one embodiment of the present application, as shown in FIG. 8. In embodiment 8, when the second transmission occasion overlaps with the first time-domain resource, the first threshold is the first candidate threshold; when the second transmission occasion does not overlap with the first time-domain resource, the first threshold is the second candidate threshold. In one embodiment, if the second transmission occasion overlaps with the first time-domain resource, the first threshold is the first candidate threshold; if the second transmission occasion does not overlap with the first time-domain resource, the first threshold is the second candidate threshold.

In one embodiment, the first threshold is the first candidate threshold or the second candidate threshold.

In one embodiment, whether the second transmission occasion overlaps with the first time-domain resource is used by the first node to determine the first threshold from the first candidate threshold and the second candidate threshold.

In one embodiment, whether there exists a symbol in the second transmission occasion being configured as the first type is used to determine the first threshold.

In one embodiment, when there exists a symbol in the second transmission occasion being configured as the first type, the first threshold is the first candidate threshold; when each symbol in the second transmission occasion is not configured as the first type, the first threshold is the second candidate threshold.

In one embodiment, the first candidate threshold and the second candidate threshold are respectively non-negative real numbers.

In one embodiment, the first candidate threshold and the second candidate threshold are respectively non-negative integers.

In one embodiment, a unit for measurement for the first candidate threshold and a unit for measurement for the second candidate threshold are respectively dB.

In one embodiment, a unit for measurement for the first candidate threshold and a unit for measurement for the second candidate threshold are respectively milliwatt.

In one embodiment, the first candidate threshold and the second candidate threshold are respectively linear values.

In one embodiment, the first candidate threshold is smaller than the second candidate threshold.

Embodiment 9

Embodiment 9 illustrates a schematic diagram of a second sub-power value being used to determine a second power value according to one embodiment of the present application, as shown in FIG. 9. In embodiment 9, the second sub-power value is used by the first node to determine the second power value.

In one embodiment, the second power value is linearly correlated to the second sub-power value, and a linear coefficient between the second power value and the second sub-power value is equal to 1.

In one embodiment, the second signal only comprises the first sub-signal; the second power value is equal to the second sub-power value.

In one embodiment, the second signal comprises the Q2 sub-signals, and transmit power of the Q2 sub-signals are respectively equal to Q2 sub-power values; the second sub-power value is a sub-power value corresponding to the second sub-signal among the Q2 sub-power values; a sum of linear values of the Q2 sub-power values is used to determine the second power value.

In one subembodiment of the above embodiment, the Q2 sub-power values are measured by dBm.

In one subembodiment of the above embodiment, the Q2 sub-power values are respectively calculated according to methods in one of chapters 7.1, 7.2, 7.3 or 7.4 of 3GPP TS38.213.

In one subembodiment of the above embodiment, a linear value of the second power value is equal to a sum of linear values of the Q2 sub-power values.

In one subembodiment of the above embodiment, a linear value of the second power value is equal to a sum of linear values of Q4 sub-power values in the Q2 sub-power values, and the Q4 sub-power values respectively correspond to Q4 sub-signals with highest priorities among the Q2 sub-signals; a sum of linear values of the Q4 sub-power values is not greater than a linear value of the third maximum transmit power, and a sum of linear values of (Q4+1) sub-power values is greater than a linear value of the third maximum transmit power; the (Q4+1) sub-power values respectively correspond to the (Q4+1) sub-signals with highest priorities among the Q2 sub-signals; Q4 is a positive integer less than the Q2.

Embodiment 10

Embodiment 10 illustrates a schematic diagram of a second sub-power value according to one embodiment of the present application, as shown in FIG. 10. In embodiment 10, the second sub-power value is equal to a minimum value between the second reference power value and the second power threshold.

In one embodiment, the second sub-power value is measured by dBm.

In one embodiment, the second reference power value is measured by dBm.

In one embodiment, the second power threshold is measured by dBm.

In one embodiment, expected transmit power of the second sub-signal is equal to the second sub-power value.

In one embodiment, unreduced transmit power of the second sub-signal is equal to the second sub-power value.

In one embodiment, actual transmit power of the second sub-signal is equal to the second sub-power value.

In one embodiment, actual transmit power of the second sub-signal is less than the second sub-power value.

In one embodiment, the second sub-power value is calculated based on the method in one of the chapters 7.1, 7.2, 7.3, or 7.4 of 3GPP TS38.213.

In one embodiment, the second power threshold is $P_{CMAX,f,c}(i)$, the $P_{CMAX,f,c}(i)$ is a maximum output power of transmission occasion i on carrier f of serving cell c, and the second subsignal is transmitted in transmission occasion i on carrier f of serving cell c; the second serving cell is the serving cell c, and the second transmission occasion is transmission occasion i.

In one embodiment, the second reference power value is linearly correlated with a sum of R2 offsets, R2 being a positive integer; a linear coefficient between the second reference power value and a sum of the R2 offsets is 1; any of the R2 offsets is indicated by Transmitter Power Control (TPC).

In one subembodiment of the above embodiment, a sum of the R2 offsets is power control adjustment state.

In one embodiment, the second reference power value is linearly related to a first component, and a linear coefficient between the second reference power value and the first component is 1.

In one subembodiment of the above embodiment, the first component is target power.

In one subembodiment of the above embodiment, the first component is Po.

In one embodiment, the second reference power value is linearly associated with a second component, the second component is related to a bandwidth in Resource Block to which the second sub-signal is assigned, and a linear coefficient between the second reference power value and the second component is 1.

In one embodiment, the second reference power value and the second pathloss are linearly correlated, and a linear coefficient between the second reference power value and the second pathloss is a non-negative real number less than or equal to 1.

In one subembodiment of the above embodiment, the second pathloss is measured by dB.

In one subembodiment of the above embodiment, a linear coefficient of the second reference power value and the second pathloss is equal to 1.

In one subembodiment of the above embodiment, a linear coefficient of the second reference power value and the second pathloss is less than 1.

In one embodiment, the second reference power value is linearly correlated to a third component, and the third component is related to a Modulation and Coding Scheme (MCS) of the second sub-signal, and a linear coefficient between the second reference power value and the third component is 1.

In one embodiment, the second reference power value is linearly related to a fourth component, and a linear coefficient between the second reference power value and the fourth component is 1; the fourth component is related to a number of symbol(s) occupied by the second sub-signal.

In one embodiment, the second reference power value is linearly related to a fifth component, and a linear coefficient between the second reference power value and the fifth component is 1; the fifth component is related to a format of a PUCCH corresponding to the second sub-signal.

In one embodiment, the second reference power value is respectively and linearly correlated with the first component, the second component, the third component, a sum of the R2 offsets and the second pathloss; a linear coefficient between the second reference power value and the first component, the second component, the third component, and a sum of the R2 offsets is 1, and a linear coefficient between the second reference power value and the second pathloss is a non-negative real number not greater than 1.

In one embodiment, the second reference power value is respectively and linearly correlated with the first component, the second component, the fourth component, the fifth component, a sum of the R2 offsets and the second pathloss; a linear coefficient between the second reference power value, the first component, the second component, the fourth component, the fifth component and a sum of the R2 offsets as well as the second pathloss are all 1.

In one embodiment, the second reference power value is respectively and linearly correlated with the first component, the second component, a sum of the R2 offsets and the second pathloss; a linear coefficient between the second reference power value and the first component, the second component, and a sum of the R2 offsets is 1, and a linear coefficient between the second reference power value and the second pathloss is a non-negative real number not greater than 1.

In one embodiment, the second reference power value is respectively and linearly correlated with the first component and the second pathloss; a linear coefficient between the second reference power value and the first component as well as the second pathloss are all 1

Embodiment 11

Embodiment 11 illustrates a schematic diagram of a first sub-power value being used to determine a first power value according to one embodiment of the present application, as shown in FIG. 11. In embodiment 11, the first signal comprises the first sub-signal, and transmit power of the first sub-signal is equal to the first sub-power value; the first sub-power value is used by the first node to determine the first power value.

In one embodiment, the first sub-signal is transmitted in a serving cell in the first cell group.

In one embodiment, the first sub-signal is transmitted on a PCell of the first cell group.

In one embodiment, the first sub-signal is transmitted on a PSCell of the first cell group.

In one embodiment, the first sub-signal is transmitted on a serving cell different from a PCell in the first cell group.

In one embodiment, the first sub-signal is transmitted on a serving cell different from a PSCell in the first cell group.

In one embodiment, the first signal only comprises the first sub-signal.

In one embodiment, the first signal comprises at least one other sub-signal other than the first sub-signal.

In one embodiment, the first power value is linearly related to the first sub-power value, and a linear coefficient between the first power and the first sub-power value is equal to 1.

In one embodiment, the first signal only comprises the first sub-signal; the first power value is equal to the first sub-power value.

In one embodiment, the first signal comprises a first sub-signal, and transmit power of the first sub-signal is respectively equal to a first sub-power value; the first sub-power value is a sub-power value corresponding to the first sub-signal among the Q1 sub-power values; a sum of linear values of the Q1 sub-power values is used to determine the first power value.

In one subembodiment of the above embodiment, the Q1 sub-power values are measured by dBm.

In one subembodiment of the above embodiment, the Q1 sub-power values are respectively calculated according to methods in one of chapters 7.1, 7.2, 7.3 or 7.4 of 3GPP TS38.213.

In one subembodiment of the above embodiment, a linear value of the first power value is equal to a sum of linear values of the Q1 sub-power values.

In one subembodiment of the above embodiment, a linear value of the first power value is equal to a sum of linear values of Q3 sub-power values in the Q1 sub-power values, and the Q3 sub-power values respectively correspond to Q3 sub-signals with highest priorities in the Q1 sub-signals; a sum of linear values of the Q3 sub-power values is not greater than a linear value of the second maximum transmit power, and a sum of linear values of (Q3+1) sub-power values is greater than a linear value of the second maximum transmit power; the (Q3+1) sub-power values respectively correspond to (Q3+1) sub-signals with highest priorities in the Q1 sub-signals; Q3 is a positive integer less than the Q1.

Embodiment 12

Embodiment 12 illustrates a schematic diagram of a first sub-power value according to one embodiment of the present application, as shown in FIG. 12. In embodiment 12, the first sub-power value is equal to a minimum value between the first reference power value and the first power threshold.

In one embodiment, actual transmit power of the first sub-signal is equal to the first sub-power value.

In one embodiment, the first sub-power value is measured by dBm.

In one embodiment, the first reference power value is measured by dBm.

In one embodiment, the first power threshold is measured by dBm.

In one embodiment, the first sub-power value is calculated based on the method in one of the chapters 7.1, 7.2, 7.3, or 7.4 of 3GPP TS38.213.

In one embodiment, the first power threshold is $P_{CMAX,f,c}(i)$, the $P_{CMAX,f,c}(i)$ is a maximum output power of transmission occasion i on carrier f of serving cell c, and the first subsignal is transmitted in transmission occasion i on carrier f of serving cell c; the serving cell c is a serving cell in the first cell group, and the second transmission occasion is transmission occasion i.

In one embodiment, the first reference power value is linearly correlated with a sum of R1 offsets, R1 being a positive integer; a linear coefficient between the first reference power value and a sum of the R1 offsets is 1; any of the R1 offsets is indicated by TPC.

In one subembodiment of the above embodiment, a sum of the R1 offsets is power control adjustment state.

In one embodiment, the first reference power value is linearly correlated with a sixth component, and a linear coefficient between the first reference power value and the sixth component is 1.

In one subembodiment of the above embodiment, the sixth component is target power.

In one subembodiment of the above embodiment, the sixth component is Po.

In one embodiment, the first reference power value is linearly correlated with a seventh component, the seventh component is related to a bandwidth in resource block to which the first sub-signal is assigned, and a linear coefficient between the first reference power value and the seventh component is 1.

In one embodiment, the first reference power value is linearly correlated with a first pathloss, and a linear coefficient between the first reference power value and the first pathloss is a non-negative real number less than or equal to 1.

In one subembodiment of the above embodiment, the first pathloss is measured by dB.

In one embodiment, the first reference power value is linearly correlated with an eighth component, the eighth component is related to an MCS of the first sub-signal, and a linear coefficient between the first reference power value and the eighth component is 1.

In one embodiment, the first reference power value is linearly correlated with a ninth component, and a linear coefficient between the first reference power value and the ninth component is 1; the ninth component is related to a number of symbol(s) occupied by the first sub-signal.

In one embodiment, the first reference power value is linearly correlated with a tenth component, and a linear coefficient between the first reference power value and the tenth component is 1; the tenth component is related to a format of a PUCCH corresponding to the first sub-signal.

In one embodiment, the first reference power value is respectively and linearly correlated with the sixth component, the seventh component, the eighth component, a sum of the R1 offsets as well as the first pathloss; a linear coefficient between the first reference power value and the sixth component, the seventh component, the eighth component as well as a sum of the R1 offsets is 1, and a linear coefficient between the first reference power value and the first pathloss is a non-negative real number not greater than 1.

In one embodiment, the first reference power value is respectively and linearly correlated with the sixth component, the seventh component, the ninth component, the tenth component, a sum of the R1 offsets as well as the first pathloss. a linear coefficient between the first reference power value and the sixth component, the seventh component, the ninth component, the tenth component, a sum of the R1 offsets as well as the first pathloss is 1.

In one embodiment, the first reference power value is respectively and linearly correlated with the sixth component, the seventh component, a sum of the R1 offsets as well as the first pathloss; a linear coefficient between the first reference power value and the sixth component, the seventh component as well as a sum of the R1 offsets is 1, and a linear coefficient between the first reference power value and the first pathloss is a non-negative real number not greater than 1.

In one embodiment, the first reference power value is respectively and linearly correlated with the sixth component and the first pathloss; a linear coefficient between the first reference power value and the sixth component as well as the first pathloss are all 1

Embodiment 13

Embodiment 13 illustrates a schematic diagram of whether a second transmission occasion overlaps with a first time-domain resource being used to determine a first power parameter set according to one embodiment of the present application, as shown in FIG. 13. In embodiment 13, the first power parameter set is used by the first node to calculate the second power value; whether the second transmission occasion overlaps with the first time-domain resource is used by the first node to determine the first power parameter set.

In one embodiment, the first power parameter set comprises the first component.

In one embodiment, the first power parameter set only comprises the first component.

In one embodiment, the first power parameter set comprises the second power threshold.

In one embodiment, the first power parameter set only comprises the second power threshold.

In one embodiment, the first power parameter set comprises the first component and the second power threshold.

In one embodiment, the first power parameter set comprises a linear coefficient between the second reference power value and the second pathloss.

In one embodiment, whether there exists a symbol in the second transmission occasion being configured as the first type is used to determine the first power parameter set.

In one embodiment, the first power parameter set is one of a first candidate power parameter set and a second candidate power parameter set; when the second transmission occasion overlaps with the first time-domain resource, the first power parameter set is the first candidate power parameter set; when the second transmission occasion does not overlap with the first time-domain resource, the first power parameter set is the second candidate power parameter set.

In one embodiment, the first power parameter set is one of a first candidate power parameter set and a second candidate power parameter set; when there exists a symbol in the second transmission occasion being configured as the first type, the first power parameter set is the first candidate power parameter set; when each symbol in the second transmission occasion is not configured as the first type, the first power parameter set is the second candidate power parameter set.

In one embodiment, the first candidate power parameter set and the second candidate power parameter set are respectively configurable.

In one embodiment, a value of at least one power parameter in the first candidate power parameter set is not equal to a value of a power parameter corresponding to the second candidate power parameter set.

In one embodiment, the first power parameter set comprises the first component; when the second transmission occasion overlaps with the first time-domain resource, a value of the first component is greater than a value of the first component when the second transmission occasion does not overlap with the first time-domain resource.

Embodiment 14

Embodiment 14 illustrates a structure block diagram of a processor in a first node according to one embodiment of the present application, as shown in FIG. 14. In FIG. 14, a processor 1400 in a first node comprises a first receiver 1401 and a first transmitter 1402.

In Embodiment 14, the first receiver 1401 receives a first signaling; the first transmitter 1402 transmits a first signal in a first transmission occasion in a first cell group; the first transmitter 1402 transmits a second sub-signal in a second transmission occasion in a second serving cell, or, drops transmitting a second sub-signal in a second transmission occasion in a second serving cell.

In embodiment 14, the first signaling is used to determine a first time-domain resource; the first cell group comprises at least one serving cell; the second serving cell is a serving cell in a second cell group; the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; whether the second transmission occasion overlaps with the first time-domain resource is used to determine the first threshold.

In one embodiment, the first signaling configures a symbol in the first time-domain resource as a first type.

In one embodiment, the first transmitter 1402 transmits a third sub-signal in the second transmission occasion in a third serving cell; herein, the second sub-signal is dropped to be transmitted in the second transmission occasion in the second serving cell; the third serving cell is a serving cell in the second cell group, and the second signal comprises the third sub-signal.

In one embodiment, the first receiver 1401 receives a first information block; herein, the first information block indicates a first candidate threshold and a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

In one embodiment, transmit power of the second sub-signal is equal to a second sub-power value, and the second sub-power value is used to determine the second power value; the second sub-power value is equal to a minimum value between a second reference power value and a second power threshold.

In one embodiment, the first signal comprises a first sub-signal, and transmit power of the first sub-signal is equal to a first sub-power value; the first sub-power value is used to determine the first power value; the first sub-power value is equal to a minimum value between a first reference power value and a first power threshold.

In one embodiment, a first power parameter set is used to calculate the second power value; whether the second transmission occasion overlaps with the first time-domain resource is used to determine the first power parameter set.

In one embodiment, the first transmitter 1402 judges whether the second sub-signal is transmitted in the second transmission occasion in the second serving cell.

In one embodiment, the first time-domain resource comprises at least one symbol; the symbol is an OFDM symbol or a DFT-S-OFDM symbol; a transmitter of the first signaling receives and transmits a radio signal in the first time-domain resource at the same time; the first transmission occasion overlaps with the second transmission occasion in time domain; the first signal overlaps with the second sub-signal in time domain; the second signal only comprises the second sub-signal, or, the second comprises Q2 sub-signals, Q2 being a positive integer greater than 1, the Q2 sub-signals are respectively transmitted on Q2 serving cells in the second cell group, and the second sub-signal is one of the Q2 sub-signals.

In one embodiment, the meaning of the phrase of whether the second transmission occasion overlaps with the first time-domain resource comprises: whether there exists a symbol in the second transmission occasion being configured as the first type.

In one embodiment, the first node is a UE.

In one embodiment, the first node is a relay node.

In one embodiment, the first receiver 1401 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 1402 comprises at least one of the antenna 452, the transmitter 454, the transmitting processor 468, the multi-antenna transmitting processor 457, the controller/processor 459, the memory 460, or the data source 467 in Embodiment 4.

Embodiment 15

Embodiment 15 illustrates a structure block diagram of a processor in a second node according to one embodiment of the present application, as shown in FIG. 15. In FIG. 15, a processor 1500 in the second node comprises a second transmitter 1501 and a second receiver 1502.

In embodiment 15, the second transmitter 1501 transmits a first signaling; a second receiver 1502 monitors a second sub-signal in a second transmission occasion in a second serving cell.

In embodiment 15, the first signaling is used to determine a first time-domain resource; the second serving cell is a serving cell in a second cell group; a target receiver of the first signaling transmits a first signal in a first transmission occasion in a first cell group, the first cell group comprises at least one serving cell; the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; whether the second transmission occasion overlaps with the first time-domain resource is used to determine the first threshold.

In one embodiment, the first signaling configures a symbol in the first time-domain resource as a first type.

In one embodiment, the second receiver 1502 monitors and receives a third sub-signal in the second transmission occasion in a third serving cell; herein, the second sub-signal is dropped to be transmitted in the second transmission occasion in the second serving cell; the third serving cell is a serving cell in the second cell group, and the second signal comprises the third sub-signal.

In one embodiment, the second transmitter 1501 transmits a first information block; herein, the first information block indicates a first candidate threshold and a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

In one embodiment, transmit power of the second sub-signal is equal to a second sub-power value, and the second sub-power value is used to determine the second power value; the second sub-power value is equal to a minimum value between a second reference power value and a second power threshold.

In one embodiment, a first power parameter set is used to calculate the second power value; whether the second transmission occasion overlaps with the first time-domain resource is used to determine the first power parameter set.

In one embodiment, the first time-domain resource comprises at least one symbol; the symbol is an OFDM symbol or a DFT-S-OFDM symbol; a transmitter of the first signaling receives and transmits a radio signal in the first time-domain resource at the same time; the first transmission occasion overlaps with the second transmission occasion in time domain; the first signal overlaps with the second sub-signal in time domain; the second signal only comprises the second sub-signal, or, the second comprises Q2 sub-signals, Q2 being a positive integer greater than 1, the Q2 sub-signals are respectively transmitted on Q2 serving cells in the second cell group, and the second sub-signal is one of the Q2 sub-signals.

In one embodiment, the meaning of the phrase of whether the second transmission occasion overlaps with the first time-domain resource comprises: whether there exists a symbol in the second transmission occasion being configured as the first type.

In one embodiment, the second node is a base station.

In one embodiment, the second node is a UE.

In one embodiment, the second node is a relay node.

In one embodiment, the second transmitter 1501 comprises at least one of the antenna 420, the transmitter 418, the transmitting processor 416, the multi-antenna transmitting processor 471, the controller/processor 475, or the memory 476 in Embodiment 4.

In one embodiment, the second receiver 1502 comprises at least one of the antenna 420, the receiver 418, the receiving processor 470, the multi-antenna receiving processor 472, the controller/processor 475, the memory 476 in Embodiment 4.

Embodiment 16

Embodiment 16 illustrates a structure block diagram of a processor in a second node according to one embodiment of the present application, as shown in FIG. 16. In FIG. 16, the processor 1600 in the second node comprises a first processor 1601.

In embodiment 16, a first processor 1601 receives a first signal in a first transmission occasion in a first cell group.

In embodiment 16, the first cell group comprises at least one serving cell; a transmitter of the first signal transmits or drops transmitting a second sub-signal in a second transmission occasion in a second serving cell; the second serving cell is a serving cell in a second cell group; the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; a first signaling is used to determine a first time-domain resource; whether the second transmission occasion overlaps with the first time-domain resource is used to determine the first threshold.

In one embodiment, the first signaling configures a symbol in the first time-domain resource as a first type.

In one embodiment, the first threshold is a first candidate threshold or a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

In one embodiment, the first processor 1601 transmits a first information block; herein, the first information block indicates the first candidate threshold and the second candidate threshold.

In one embodiment, the first signal comprises a first sub-signal, and transmit power of the first sub-signal is equal to a first sub-power value; the first sub-power value is used to determine the first power value; the first sub-power value is equal to a minimum value between a first reference power value and a first power threshold.

In one embodiment, the third node is a base station.

In one embodiment, the third node is a UE.

In one embodiment, the third node is a relay node.

In one embodiment, the first processor 1601 comprises at least one of the antenna 420, the transmitter/receiver 418, the transmitting processor 416, the receiving processor 470, the multi-antenna transmitting processor 471, the multi-antenna receiving processor 472, the controller/processor 475 or memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, vehicles, cars, RSUs, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets and other wireless communication devices. The base station or system equipment in the present application includes but is not limited to macro-cellular base stations, micro-cellular base stations, Pico base stations, home base stations, relay base stations, eNB, gNB, Transmitter Receiver Points (TRPs), GNSS, relay satellites, satellite base stations, space base stations, RSUs, UAVs, test devices, such as a transceiver or a signaling tester that simulates some functions of a base station, and other wireless communication devices.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
   a first receiver, receiving a first signaling, the first signaling being used to determine a first time-domain resource;

a first transmitter, transmitting a first signal in a first transmission occasion in a first cell group, the first cell group comprising at least one serving cell; and the first transmitter, transmitting a second sub-signal in a second transmission occasion in a second serving cell, or, dropping transmitting the second sub-signal in the second transmission occasion in the second serving cell; the second serving cell being a serving cell in a second cell group;

wherein the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; whether the second transmission occasion overlaps with the first time-domain resource is used to determine the first threshold.

2. The first node according to claim 1, wherein the first signaling configures a symbol in the first time-domain resource as a first type.

3. The first node according to claim 1, wherein the first transmitter transmits a third sub-signal in the second transmission occasion in the third serving cell; wherein the second sub-signal is dropped to be transmitted in the second transmission occasion in the second serving cell; the third serving cell is a serving cell in the second cell group, and the second signal comprises the third sub-signal.

4. The first node according to claim 1, wherein the first receiver receives a first information block; wherein the first information block indicates a first candidate threshold and a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

5. The first node according to claim 1, wherein transmit power of the second sub-signal is equal to a second sub-power value, and the second sub-power value is used to determine the second power value; the second sub-power value is equal to a minimum value between a second reference power value and a second power threshold.

6. The first node according to claim 1, wherein the first signal comprises a first sub-signal, and transmit power of the first sub-signal is equal to a first sub-power value; the first sub-power value is used to determine the first power value;

the first sub-power value is equal to a minimum value between a first reference power value and a first power threshold.

7. The first node according to claim 1, wherein a first power parameter set is used to calculate the second power value; whether the second transmission occasion overlaps with the first time-domain resource is used to determine the first power parameter set.

8. A second node for wireless communications, comprising:

a second transmitter, transmitting a first signaling, the first signaling being used to determine a first time-domain resource; and a second receiver, monitoring a second sub-signal in a second transmission occasion in a second serving cell, the second serving cell being a serving cell in a second cell group;

wherein a target receiver of the first signaling transmits a first signal in a first transmission occasion in a first cell group, the first cell group comprises at least one serving cell; the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; whether the second transmission occasion overlaps with the first time-domain resource is used to determine the first threshold.

9. The second node according to claim 8, wherein the first signaling configures a symbol in the first time-domain resource as a first type.

10. The second node according to claim 8, wherein the second receiver monitors and receives a third sub-signal in the second transmission occasion in a third serving cell; wherein the second sub-signal is dropped to be transmitted in the second transmission occasion in the second serving cell; the third serving cell is a serving cell in the second cell group, and the second signal comprises the third sub-signal.

11. The second node according to claim 8, wherein the second transmitter transmits a first information block; wherein the first information block indicates a first candidate threshold and a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

12. The second node according to claim 8, wherein transmit power of the second sub-signal is equal to a second sub-power value, and the second sub-power value is used to determine the second power value; the second sub-power value is equal to a minimum value between a second reference power value and a second power threshold.

13. The second node according to claim 8, wherein a first power parameter set is used to calculate the second power value; whether the second transmission occasion overlaps with the first time-domain resource is used to determine the first power parameter set.

14. A method in a first node for wireless communications, comprising:

receiving a first signaling, the first signaling being used to determine a first time-domain resource;

transmitting a first signal in a first transmission occasion in a first cell group, the first cell group comprising at least one serving cell; and transmitting a second sub-signal in a second transmission occasion in a second serving cell, or, dropping transmitting the second sub-signal in the second transmission occasion in the second serving cell; the second serving cell being a serving cell in a second cell group;

wherein the first transmission occasion and the second transmission occasion respectively comprise at least one symbol; transmit power of the first signal is equal to a first power value; transmit power of a second signal is equal to a second power value, and the second signal comprises the second sub-signal; whether a sum of a linear value of the first power value and a linear value of the second power value minus a linear value of a first maximum transmit power is greater than a first threshold is used to determine whether the second sub-signal is transmitted in the second transmission occasion in the second serving cell; when a sum of a linear value of the first power value and a linear value of the second power value minus a linear value of the first maximum transmit power is greater than the first threshold, the second sub-signal is dropped to be transmitted in the second transmission occasion in the second serving cell; when a sum of a linear value of the first power value and a linear value of the second power value minus a linear value of the first maximum transmit power is not greater than the first threshold, the second sub-signal is transmitted in the second transmission occasion in the second serving cell; whether the second transmission occasion overlaps with the first time-domain resource is used to determine the first threshold.

15. The method according to claim 14, wherein the first signaling configures a symbol in the first time-domain resource as a first type.

16. The method according to claim 14, comprising:

transmitting a third sub-signal in the second transmission occasion in a third serving cell;

wherein the second sub-signal is dropped to be transmitted in the second transmission occasion in the second serving cell; the third serving cell is a serving cell in the second cell group, and the second signal comprises the third sub-signal.

17. The method according to claim 14, comprising:

receiving a first information block;

wherein the first information block indicates a first candidate threshold and a second candidate threshold; when the second transmission occasion overlaps with the first time-domain resource, the first threshold is the first candidate threshold; when the second transmission occasion does not overlap with the first time-domain resource, the first threshold is the second candidate threshold; the first candidate threshold is not equal to the second candidate threshold.

18. The method according to claim 14, wherein transmit power of the second sub-signal is equal to a second sub-power value, and the second sub-power value is used to determine the second power value; the second sub-power value is equal to a minimum value between a second reference power value and a second power threshold.

19. The method according to claim 14, wherein the first signal comprises a first sub-signal, and transmit power of the first sub-signal is equal to a first sub-power value; the first sub-power value is used to determine the first power value; the first sub-power value is equal to a minimum value between a first reference power value and a first power threshold.

20. The method according to claim 14, wherein a first power parameter set is used to calculate the second power value; whether the second transmission occasion overlaps with the first time-domain resource is used to determine the first power parameter set.

* * * * *